US012764760B2

(12) United States Patent
Ma et al.

(10) Patent No.: US 12,764,760 B2
(45) Date of Patent: Oct. 13, 2026

(54) METHOD, DEVICE, AND SYSTEM FOR POWER SAVING IN WIRELESS NETWORKS

(71) Applicant: ZTE CORPORATION, Shenzhen (CN)

(72) Inventors: Xiaoying Ma, Shenzhen (CN); Mengzhu Chen, Shenzhen (CN); Xuan Ma, Shenzhen (CN); Jun Xu, Shenzhen (CN); Focai Peng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 184 days.

(21) Appl. No.: 18/727,504

(22) PCT Filed: Jan. 11, 2022

(86) PCT No.: PCT/CN2022/071203
§ 371 (c)(1),
(2) Date: Jul. 9, 2024

(87) PCT Pub. No.: WO2023/133665
PCT Pub. Date: Jul. 20, 2023

(65) Prior Publication Data
US 2025/0126622 A1 Apr. 17, 2025

(51) Int. Cl.
*H04W 72/232* (2023.01)
*H04W 72/231* (2023.01)

(52) U.S. Cl.
CPC ....... *H04W 72/232* (2023.01); *H04W 72/231* (2023.01)

(58) Field of Classification Search
None
See application file for complete search history.

(56) References Cited

U.S. PATENT DOCUMENTS

2020/0229092 A1* 7/2020 Wu ........................ H04W 76/28
2021/0400645 A1 12/2021 Park

FOREIGN PATENT DOCUMENTS

CN 110830198 A 2/2020
CN 111867021 A 10/2020
CN 113767699 A 12/2021
WO WO-2021/063875 A1 4/2021
(Continued)

OTHER PUBLICATIONS

International Search Report in Application No. PCT/CN2022/071203, dated Apr. 28, 2022, 2 pages.
(Continued)

*Primary Examiner* — Saad Khawar
(74) *Attorney, Agent, or Firm* — Morgan, Lewis & Bockius LLP

(57) ABSTRACT

This disclosure relates generally to a method, device, and system for saving UE power consumption in wireless communications. One method performed by a UE including receiving, from a wireless communication node in the wireless network, a configuration message comprising configuration information associated with a PDCCH monitoring behavior set; receiving, from the wireless communication node, a control message indicating a PDCCH monitoring behavior in the PDCCH monitoring behavior set; and determining a PDCCH monitoring behavior based on the control message.

20 Claims, 8 Drawing Sheets

(56) References Cited

FOREIGN PATENT DOCUMENTS

| | | | |
|---|---|---|---|
| WO | WO-2021/098052 | A1 | 5/2021 |
| WO | WO-2021/109500 | A1 | 6/2021 |
| WO | WO-2022/000267 | A1 | 1/2022 |

OTHER PUBLICATIONS

Ericsson. "UE power saving using search space set switching" 3GPP TSG RAN WG1 #101-e, e-Meeting, R1-2004360, May 25-Jun. 5, 2020.

Catt. "Details of PEI configuration" 3GPP TSG RAN WG1 #106-e, e-Meeting, R1-2106985, Aug. 16-27, 2021.

Catt. "PDCCH monitoring adaptation" 3GPP TSG RAN WG1 #107-e, e-Meeting, R1-2111269, Nov. 11-19, 2021.

CMCC. "Discussion on PDCCH monitoring reduction during DRX active time" 3GPP TSG RAN WG1 #107-e, e-Meeting, R1-2111619, Nov. 11-19, 2021.

Ericsson. "Design for power savings mechanisms in the active time" 3GPP TSG RAN WG1 #107-e, e-Meeting, R1-2112152, Nov. 11-19, 2021.

Fgi et al. "Discussion on extension(s) to Rel-16 DCI-based power saving adaptation" 3GPP TSG RAN WG1 #107-e, e-Meeting, R1-2112075, Nov. 11-19, 2021.

Lenovo et al. "Enhanced DCI based power saving adaptation" 3GPP TSG RAN WG1 Meeting #107-e, e-Meeting, R1-2111947, Nov. 11-19, 2021.

LG Electronics. "Discussion on DCI-based power saving adaptation during DRX Active Time" 3GPP TSG RAN WG1 #106b-e, e-Meeting, R1-2109982, Oct. 11-19, 2021.

Mediatek Inc. "On enhancements to DCI-based UE power saving during DRX active time" 3GPP TSG RAN WG1 #106bis-e, e-Meeting, R1-2109584, Aug. 16-27, 2021.

Nokia et al. "Open issues on PDCCH monitoring adaptation for UE power saving" 3GPP TSG RAN WG1 #107-e, e-Meeting, R1-2112372, Nov. 11-19, 2021.

Oppo. "DCI-based power saving adaptation solutions" 3GPP TSG RAN WG1 #107-e, e-Meeting, R1-2111327, Nov. 11-19, 2021.

Samsung. "Discussion on DCI-based power saving techniques" 3GPP TSG RAN WG1 #106bis, e-Meeting, R1-2109503, Oct. 11-19, 2021.

Spreadtrum Communications. "Discussion on power saving techniques for connected-mode UE" 3GPP TSG RAN WG1 #106bis-e, e-Meeting, R1-2108918, Oct. 11-19, 2021.

Vivo. "Fl summary#1 of DCI-based power saving adaptation" 3GPP TSG RAN WG1 #106-e, E-Meeting, R1-2108224, Aug. 16-27, 2021.

Search Report in Chinese Application No. 2022800785584, dated Jan. 22, 2025, 6 pages, including translation.

Office Action in Chinese Application No. 202280078558.4, dated Jan. 24, 2025, 14 pages, including translation.

Interdigital, Inc. "PDCCH monitoring reduction in Active Time", 3GPP TSG RAN WG1 #106-e, e-Meeting, R1-2107808, Aug. 16-27, 2021.

Zte et al. "Extension to Rel-16 DCI-based power saving adaptation during DRX Active Time", 3GPP TSG RAN WG1 #107-e, e-Meeting, R1-2110940, Nov. 11-Nov. 19, 2021.

* cited by examiner

METHOD, DEVICE, AND SYSTEM FOR POWER SAVING IN WIRELESS NETWORKS

CROSS REFERENCE TO RELATED APPLICATIONS

This is a National Stage Application, filed under 35 U.S.C. 371, of International Patent Application No. PCT/CN2022/071203, filed Jan. 11, 2022, entitled "METHOD, DEVICE, AND SYSTEM FOR POWER SAVING IN WIRELESS NETWORKS," the disclosure of which is incorporated herein by reference in its entirety.

TECHNICAL FIELD

This disclosure is directed generally to wireless communications, and particularly to a method, device, and system for saving User Equipment (UE) power consumption.

BACKGROUND

Energy efficiency is a key performance index in the wireless communication network. Controlling power consumption and reducing energy cost is critical for developing and deploying a wireless communication network. Energy saving technology plays an essential role in achieving this goal. From a UE perspective, UE battery life has great impact on user experience. It is beneficial to have the capability to dynamically control the power consumption of a UE yet still meet performance requirement.

SUMMARY

This disclosure is directed to a method, device, and system for saving UE power consumption in wireless communications.

In some embodiments, a method performed by a UE in a wireless network is disclosed. The method may include receiving, from a wireless communication node in the wireless network, a configuration message comprising configuration information associated with a Physical Downlink Control Channel (PDCCH) monitoring behavior set; receiving, from the wireless communication node, a control message indicating a PDCCH monitoring behavior in the PDCCH monitoring behavior set; and determining a PDCCH monitoring behavior based on the control message.

In some embodiments, a method performed by a wireless communication node in a wireless network is disclosed. The method may include transmitting, to a UE in the wireless network, a configuration message comprising configuration information associated with a Physical Downlink Control Channel (PDCCH) monitoring behavior set; transmitting, to a UE in the wireless network, a control message indicating a PDCCH monitoring behavior in the PDCCH monitoring behavior set, wherein the control message triggers the UE to determine a PDCCH monitoring behavior based on the control message.

In some embodiments, there is a UE and/or a wireless communication node comprising a processor and a memory, wherein the processor is configured to read code from the memory and implement any methods recited in any of the embodiments.

In some embodiments, a computer program product comprising a computer-readable program medium code stored thereupon, the code, when executed by a processor, causing the processor to implement any method recited in any of the embodiments.

The above embodiments and other aspects and alternatives of their implementations are described in greater detail in the drawings, the descriptions, and the claims below.

DETAILED DESCRIPTION

Wireless Communication Network

Figure 1:
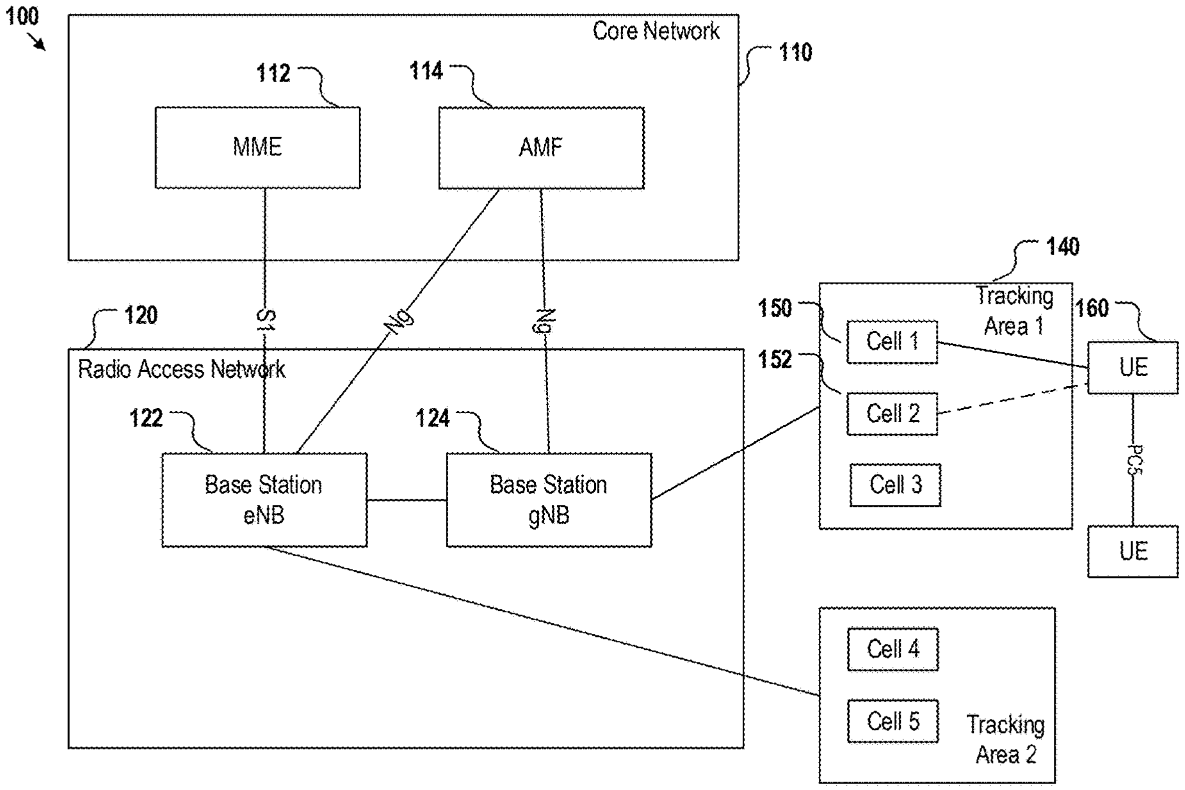
FIG. 1 shows an example wireless communication network.

FIG. 1 shows an exemplary wireless communication network 100 that includes a core network 110 and a radio access network (RAN) 120. The core network 110 further includes at least one Mobility Management Entity (MME) 112 and/or at least one Access and Mobility Management Function (AMF). Other functions that may be included in the core network 110 are not shown in FIG. 1. The RAN 120 further includes multiple base stations, for example, base stations 122 and 124. The base stations may include at least one evolved NodeB (eNB) for 4G LTE, or a Next generation NodeB (gNB) for 5G New Radio (NR), or any other type of signal transmitting/receiving device such as a UMTS NodeB. The eNB 122 communicates with the MME 112 via an Si interface. Both the eNB 122 and gNB 124 may connect to the AMF 114 via an Ng interface. Each base station manages and supports at least one cell. For example, the base station gNB 124 may be configured to manage and support cell 1, cell 2, and cell 3.

The gNB 124 may include a central unit (CU) and at least one distributed unit (DU). The CU and the DU may be co-located in a same location, or they may be split in different locations. The CU and the DU may be connected via an F1 interface. Alternatively, for an eNB which is capable of connecting to the 5G network, it may also be similarly divided into a CU and at least one DU, referred to as ng-eNB-CU and ng-eNB-DU, respectively. The ng-eNB-CU and the ng-eNB-DU may be connected via a W1 interface.

The wireless communication network 100 may include one or more tracking areas. A tracking area may include a set of cells managed by at least one base station. For example, tracking area 1 labeled as 140 includes cell 1, cell 2, and cell 3, and may further include more cells that may be managed by other base stations and not shown in FIG. 1. The wireless communication network 100 may also include at least one UE 160. The UE may select a cell among multiple cells supported by a base station to communication with the base station through Over the Air (OTA) radio communication interfaces and resources, and when the UE 160 travels in the wireless communication network 100, it may reselect a cell for communications. For example, the UE 160 may initially select cell 1 to communicate with base station 124, and it may then reselect cell 2 at certain later time point. The cell selection or reselection by the UE 160 may be based on wireless signal strength/quality in the various cells and other factors.

The wireless communication network 100 may be implemented as, for example, a 2G, 3G, 4G/LTE, or 5G cellular communication network. Correspondingly, the base stations 122 and 124 may be implemented as a 2G base station, a 3G NodeB, an LTE eNB, or a 5G NR gNB. The UE 160 may be implemented as mobile or fixed communication devices which are capable of accessing the wireless communication network 100. The UE 160 may include but is not limited to mobile phones, laptop computers, tablets, personal digital assistants, wearable devices, Internet of Things (IoT) devices, MTC/eMTC devices, distributed remote sensor devices, roadside assistant equipment, XR devices, and desktop computers. The UE 160 may also be generally referred to as a wireless communication device, or a wireless terminal. The UE 160 may support sidelink communication to another UE via a PC5 interface.

While the description below focuses on cellular wireless communication systems as shown in FIG. 1, the underlying principles are applicable to other types of wireless communication systems for paging wireless devices. These other wireless systems may include but are not limited to Wi-Fi, Bluetooth, ZigBee, and WiMax networks.

Figure 2:
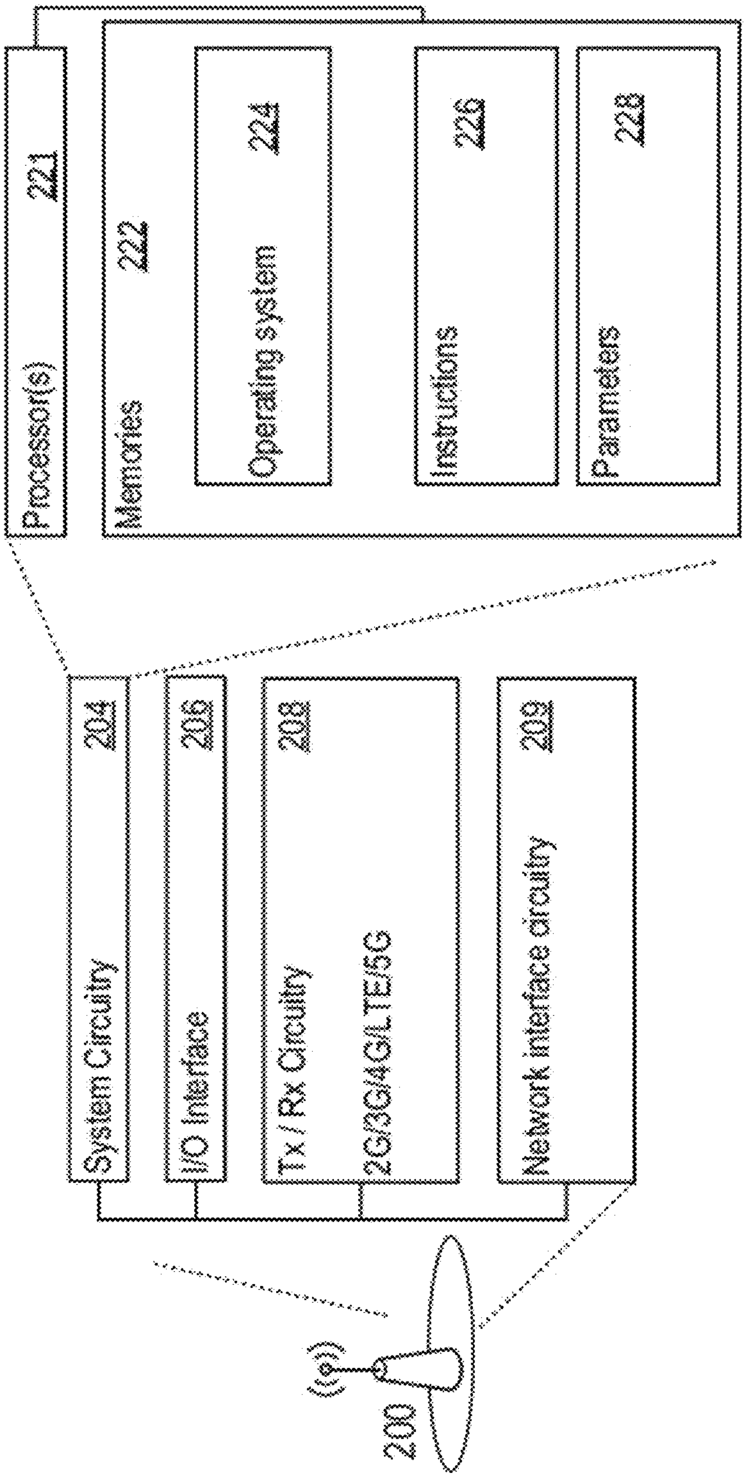
FIG. 2 shows an example wireless network node.

FIG. 2 shows an example of electronic device 200 to implement a network base station (e.g., a radio access network node), a core network (CN), and/or an operation and maintenance (OAM). Optionally in one implementation, the example electronic device 200 may include radio transmitting/receiving (Tx/Rx) circuitry 208 to transmit/receive communication with UEs and/or other base stations. Optionally in one implementation, the electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 221 to perform the functions of the network node. The parameters 228 may include parameters to support execution of the instructions 226. For example, parameters may include network protocol settings, bandwidth parameters, radio frequency mapping assignments, and/or other parameters.

Figure 3:
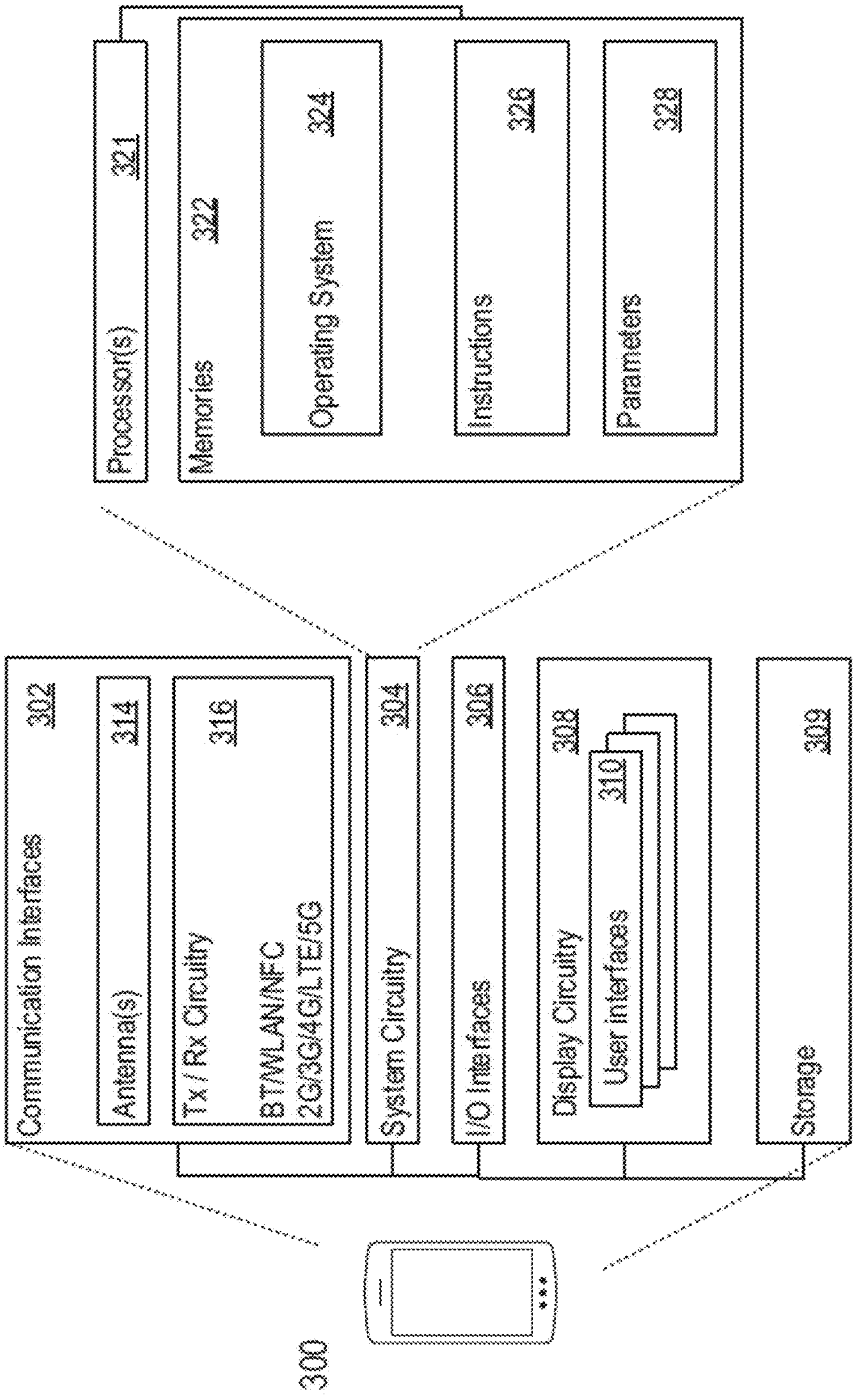
FIG. 3 shows an example user equipment.

FIG. 3 shows an example of an electronic device to implement a terminal device 300 (for example, a user equipment (UE)). The UE 300 may be a mobile device, for example, a smart phone or a mobile communication module disposed in a vehicle. The UE 300 may include a portion or all of the following: communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

Physical Downlink Control Channel (PDCCH) Monitoring

The PDCCH supports data and signaling message in a wireless communication network and plays a critical role in various aspects including, for example, downlink (DL) scheduling assignments, uplink (UL) scheduling grant, power control, paging indication, etc. A UE needs to monitor the PDCCH constantly in various manners. For example, a UE in connected state may monitor the PDCCH periodically based on Discontinuous Reception Mode (DRX). For another example, a UE in idle or inactive state may need to monitor the PDCCH for paging DCI, paging message, system information update, etc.

When monitoring the PDCCH, the UE needs to turn on certain hardware, such as its RF chain, which contributes to power consumption. Therefore, reducing the frequency of PDCCH monitoring may help reducing power consumption. The base station may coordinate with the UE to achieve such a goal. For example, the base station may be able to forecast or estimate that a UE will not have downlink data/signal to monitor for a period of time. The base station may then notify the UE, so the UE may skip PDCCH monitoring for a certain duration yet will not increase much latency.

Search Space Set Group (SSSG) Switching

In the wireless communication network, a UE may be configured with one or more search space set groups (SSSGs). Each SSSG may include zero, one or more search space (SS) set and may have its own characteristics. For example, each SSSG may be associated with a different PDCCH monitoring periodicity and may have different number of search space sets. The UE may monitor the PDCCH based on one of the SSSGs. The SSSG in which the UE monitors may be referred to as an active SSSG. The UE may consume more energy if the SSSG is configured with more search space sets and/or shorter PDCCH monitoring periodicity. In another embodiments, the UE may monitor the PDCCH based on more than one SSSGs.

The base station, based on UE traffic characteristics, may instruct the UE to switch from one SSSG to another, in order to meet a specific performance requirement and minimize UE power consumption.

UE PDCCH Monitoring Behavior

In this disclosure, various UE PDCCH monitoring behaviors are described. The base station may coordinate with or indicate to the UE to dynamically choose one of the PDCCH monitoring behaviors to meet a specific service requirement, for example, a Quality of Service (QoS) requirement. These behaviors may be categorized into two types: the first type relates to UE PDCCH monitoring skipping (for a specific duration), and the second type relates to UE SSSG switching.

The first type PDCCH monitoring behavior may include:

- deactivating PDCCH monitoring skipping (i.e., deactivate the PDCCH monitoring skipping feature), or monitoring PDCCH according to a search space set configuration.
- skipping PDCCH monitoring for a duration.

In one implementation, deactivating PDCCH monitoring skipping may mean not triggering or activating a PDCCH monitoring skipping behavior. In another implementation, deactivating PDCCH monitoring skipping may mean UE monitors PDCCH according to a search space set configuration.

There may be multiple candidate durations for which a UE may skip monitoring. Each duration corresponds to a UE PDCCH monitoring behavior. For example, the multiple candidate durations may include 5 milliseconds/slots, and 10 milliseconds/slots. Each duration represents or implies a behavior. For example, one behavior may be "skipping PDCCH monitoring for 5 milliseconds/slots", and the other behavior may be "skipping PDCCH monitoring for 10 milliseconds/slots". As such, a UE may be configured with a list of PDCCH monitoring skipping durations (also referred to as PDCCH skipping durations), each PDCCH skipping duration corresponds to a specific behavior. Alternatively, a UE may be configured with multiple lists of PDCCH skipping durations. For example, each list may serve a different SSSG, a different Bandwidth Part (BWP), a different serving cell, a different serving cell group, etc. More details will be described in later sections.

The second type PDCCH monitoring behavior may include:

- stop monitoring search space (SS) sets associated with SSSG #1 and SSSG #2 (if configured) and start monitoring SS sets associated with SSSG #0.
- stop monitoring search space (SS) sets associated with SSSG #0 and SSSG #2 (if configured) and start monitoring SS sets associated with SSSG #1.
- stop monitoring search space (SS) sets associated with SSSG #0 and SSSG #1 and start monitoring SS sets associated with SSSG #2.

In this disclosure, the first type PDCCH monitoring behavior may also be referred to as PDCCH monitoring skipping behavior (or PDCCH skipping behavior for simplicity), and the second type PDCCH monitoring behavior may also be referred to as SSSG switching behavior.

In this disclosure, there may be a first PDCCH monitoring behavior subset which includes first type PDCCH monitoring behaviors, and a second PDCCH monitoring behavior subset which includes second type PDCCH monitoring behaviors. The PDCCH monitoring behavior set includes these two subsets of behaviors.

In one implementation, the UE may be configured with various PDCCH monitoring behaviors, for example, via Radio Resource Control (RRC) signaling. The list below shows some exemplary configurations for PDCCH monitoring behaviors:

- UE is configured with a list of PDCCH skipping durations (also referred to as PDCCH skipping duration list). The number of PDCCH skipping durations in the list may be 1, 2, and 3.
- UE is configured with a list of SSSGs (also referred to as SSSG list). The number of SSSGs in the list may be 1, 2, or 3.
- UE is configured with 2 SSSGs and 1 PDCCH skipping duration.
- UE is configured with 2 SSSGs and 2 PDCCH skipping duration.
- UE is configured with 3 SSSGs and 1 PDCCH skipping duration.
- UE is not configured with any PDCCH monitoring behavior, i.e., the PDCCH monitoring skipping feature is disable or de-activated.

In one implementation, rather than in the UE level, the list of SSSGs may be configured in a finer granularity. For example, the list of SSSGs may be configured in a BWP level, a BWP group level, a serving cell level, a serving cell group level, etc.

In one implementation, when the SSSGs are configured in a BWP level, a BWP group level, a serving cell level, a serving cell group level, etc., it means that the SSSGs serve in the BWP level, a BWP group level, a serving cell level, a serving cell group level, etc. For example, each SSS may be associated with zero, one or two SSSG ID, and a SSSG list configured in the BWP is formed by the SSSGs associated with the SSS configured in a BWP. For another example, each SSS may be associated with zero, one or two SSSG ID, and a SSSG list configured in the BWP group is formed by the SSSG associated with the SSS configured in a BWP group.

In one implementation, the base station may explicitly configure the SSSG list for the UE. In one implementation, the UE may derive the SSSG list based on relevant information such as Search Space Set (SSS) assignment information. In this case, the SSSG list is configured implicitly.

Once the UE is configured with PDCCH monitoring behaviors, a base station may instruct the UE to apply a specific behavior via a control signaling, which will be described in further detail in later sections. The control signaling may instruct the UE to switch to a target SSSG in the list of SSSGs, or skip PDCCH monitoring for a specific duration as indicated by the control signaling.

In this disclosure, a list (or a set) may include multiple elements (e.g., durations, SSSGs). The number of elements in the list may be referred to as the size, or the length of the list. For example, a PDCCH skipping duration list includes {1slot, 2slot, 3slot, 4slot}, and the size of the list is 4. For another example, a SSSGs list includes {SSSG #0, SSSG #1, SSSG #2}, and the size of the list is 3.

In one implementation, when the UE starts monitoring search space (SS) sets associated with a particular SSSG, the UE may choose to stop monitoring SS sets associated with other SSSG.

The PDCCH skipping duration list may be configured at different levels, or different entities.

Figure 4A:
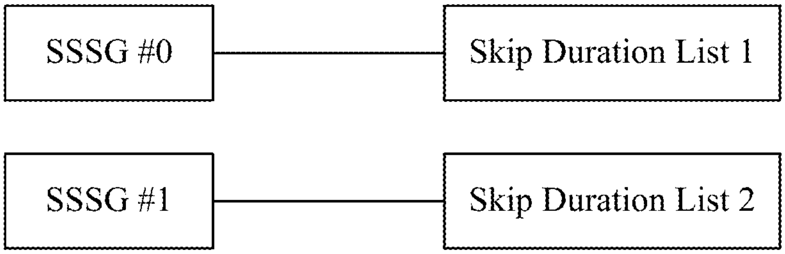
FIG. 4A shows an exemplary association between Search Space Set Group (SSSG) and Physical Downlink Control Channel (PDCCH) monitoring skipping duration list.

In one implementation, referring to FIG. 4A, one PDCCH skipping duration list is configured for each SSSG. In one implementation, the size of the PDCCH skipping duration lists are the same for all the SSSGs in a same BWP, or a same serving cell or a same serving cell group. For example, SSSG #0 and SSSG #1 are in a same BWP, and the sizes of the two corresponding PDCCH skipping duration lists (i.e., SkipDurationList 1 and SkipDurationList 2) are the same. In this case, by using PDCCH skipping duration lists of same size, the control signaling may use an information field of constant length (e.g., a constant bit-width), as the number of candidate durations in the list is the same. In another implementation, PDCCH skipping duration lists may not all have a same size. In this case, to indicate a target duration from candidate durations in different lists of various size, the information field as mentioned above may need to have different length (e.g., different bit-width).

Figure 4B:
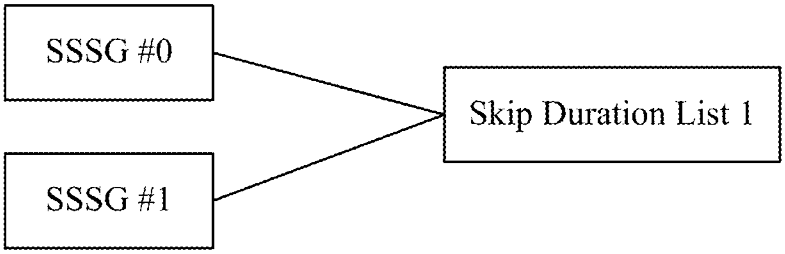
FIG. 4B shows another exemplary association between SSSG and PDCCH monitoring skipping duration list.

In one implementation, referring to FIG. 4B, multiple SSSGs, such as SSSG #0 and SSSG #1, may share a same PDCCH skipping duration list (SkipDurationList 1). These multiple SSSGs may be in a same BWP, or a same serving cell, or a same serving cell group.

Figure 4C:
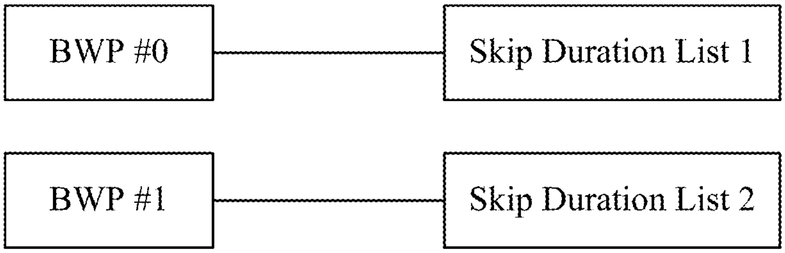
FIG. 4C shows an exemplary association between Bandwidth Part (BWP) and PDCCH monitoring skipping duration list.

In one implementation, referring to FIG. 4C, one PDCCH skipping duration list is configured for each BWP (or each BWP group).

Figure 4D:
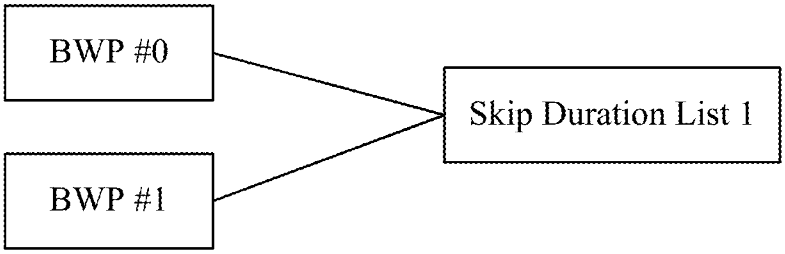
FIG. 4D shows another exemplary association between BWP and PDCCH monitoring skipping duration list.

In one implementation, referring to FIG. 4D, multiple BWPs (or BWP groups) may share a same PDCCH skipping duration list.

In one implementation, one PDCCH skipping duration list is configured for each serving cell (or each serving cell group).

In one implementation, multiple serving cells (or serving cell groups) may share a same PDCCH skipping duration list.

Control or Indicate UE PDCCH Monitoring Behavior

Figure 5:
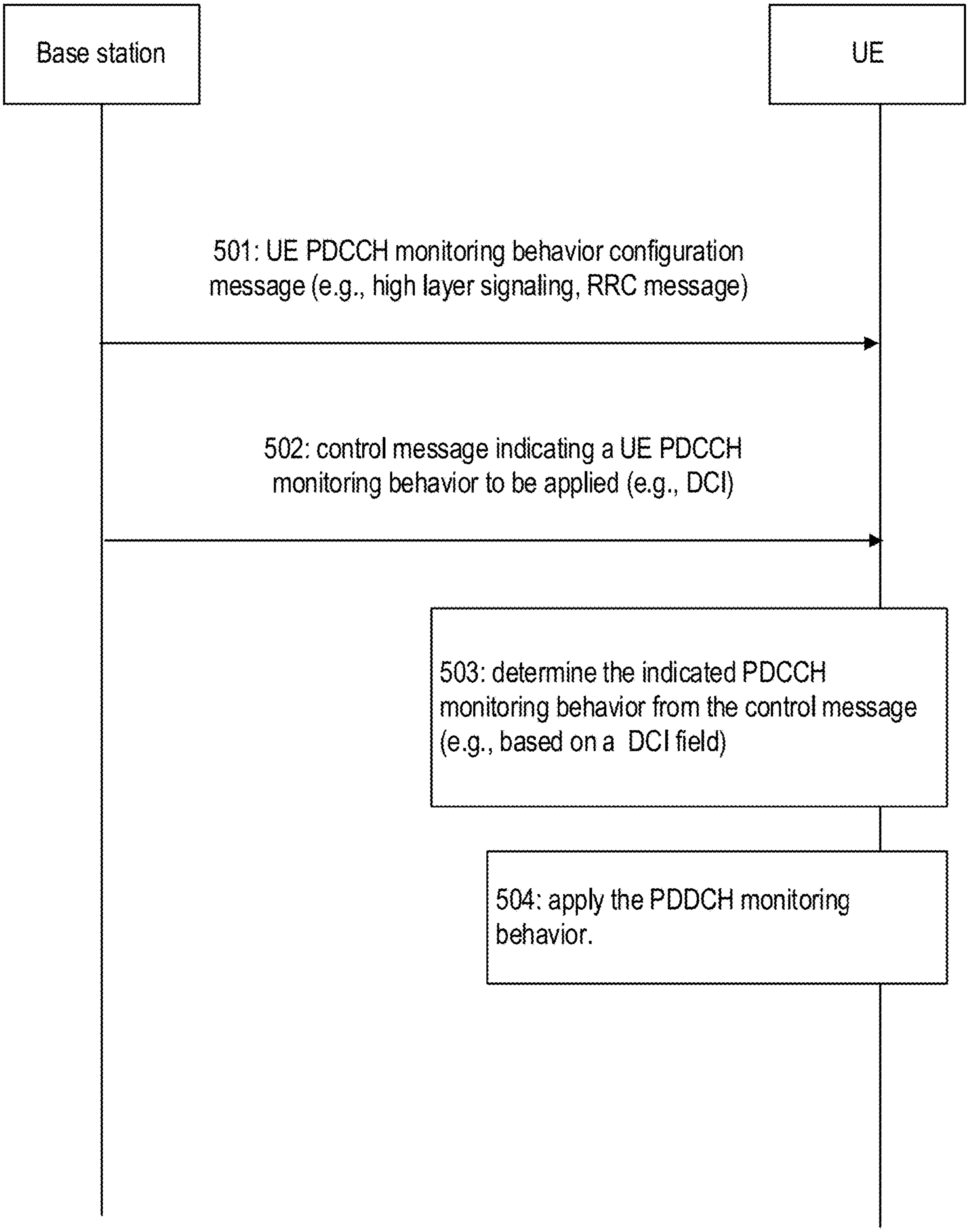
FIG. 5 shows exemplary steps for configuring and indicating UE PDCCH monitoring behavior.

In various embodiments, referring to FIG. 5, a method for controlling UE PDCCH monitoring behavior are described. The method may include a portion or all of the following step.

Step 501: The base station sends a configuration message to the UE for configuring PDCCH monitoring behaviors. The configuration message may include a list of PDCCH monitoring behaviors which need to be configured to the UE. This manner of configuration is referred to as an explicit configuration. The configuration message may also include a list of parameters related to PDCCH monitoring behaviors, and the list of parameters implicitly indicates PDCCH monitoring behaviors. For example, the list of parameters may include a list of PDCCH monitoring skipping durations, such as 2 milliseconds/slots, 5 milliseconds/slots, 10 milliseconds/slots. Each duration corresponds to a PDCCH monitoring behavior of skipping PDCCH monitoring for the duration. That is, these 3 PDCCH monitoring behavior will be configured: skipping PDCCH monitoring for 2 milliseconds/slots, skipping PDCCH monitoring for 5 milliseconds/slots, and skipping PDCCH monitoring for 10 milliseconds/slots. The SSSG switching behavior may be likely indicated by a list of parameters such as SSSG number/index. This manner of configuration is referred to as an implicit configuration as the PDCCH monitoring behavior is derived from these parameters. The list of PDCCH monitoring skipping durations, and the list of SSSG number/index may be sent to the UE in various manners. For example, they may be sent together in one signaling, or they may be sent alone, each in one signaling. The signaling may include high layer signaling, such as an RRC message.

Step 502: The UE has the list of PDCCH monitoring behaviors configured per the configuration message in step 501. In order to trigger a PDCCH monitoring behavior change, the base station sends a control message to the UE to indicate a particular PDCCH monitoring behavior that the UE needs to apply (or activate). The control message may be in the form a Downlink Control Information (DCI) message. The PDCCH monitoring behavior indication information may be carried in one or more DCI fields of the DCI message. As an example, the UE may be monitoring SSSG #0 which is associated with a PDCCH skipping duration list. The PDCCH skipping duration list has 4 candidate durations, the DCI field may indicate a specific duration in the PDCCH skipping duration list via a bitmap or a codepoint.

Step 503: The UE decodes the control message (e.g., the DCI field) to obtain the indicated PDCCH monitoring behavior. To decode the DCI field, the UE may need to determine the bit-width of the DCI filed first, as various bit-widths may need to be used to accommodate, for example, PDCCH skipping duration lists of various lengths. In one implementation, the UE may determine the indicated PDCCH monitoring behavior based on a mapping relationship between the codepoint or bitmap of the DCI field and the PDCCH monitoring behavior. In this disclosure, a DCI field may include at least one bit and the codepoint is the value represented by the at least one bit. The DCI field may represent multiple codepoints using different bit combinations.

Step 504: The UE applies the indicated PDCCH monitoring behavior. For example, the UE may skip PDCCH monitoring for a duration associated with or specified in the indicated PDCCH monitoring behavior. For example, the UE may skip PDCCH monitoring for 5 milliseconds/slots, or 10 milliseconds/slots, as determined by the indicated PDCCH monitoring behavior. For another example, the UE may start monitoring search space sets associated with SSSG #2, and stop monitoring search space sets associated with SSSG #0 and SSSG #1.

Further detail is described below.

Bit-Width of Control Signaling Field Determination

In some embodiments, to instruct or indicate to the UE which PDCCH monitoring behavior to apply (e.g., skip PDCCH monitoring for a duration in a PDCCH skipping duration list, or switch to another SSSG in a SSSG list), the base station may send a control signal such as a DC to the UE.

As shown in FIG. 5, in step 503, the UE needs to determine the indicated PDCCH monitoring behavior based on the control message (e.g., a DCI message). In one implementation, a DCI field of the DCI message may carry the indication information. The UE may map the value (e.g., the codepoint (CP)) of the DCI field to a particular PDCCH monitoring behavior. In one implementation, the mapping may also be performed based on the bitmap formed by the bits of the DCI field.

In one implementation, a bit-width of the above-mentioned DCI field may be predefined. In one implementation, the base station and/or the UE need to determine the bit-width of the DCI field.

The following procedures may apply in a BWP, a BWP group, or a serving cell, or a serving cell group.

Figure 6:
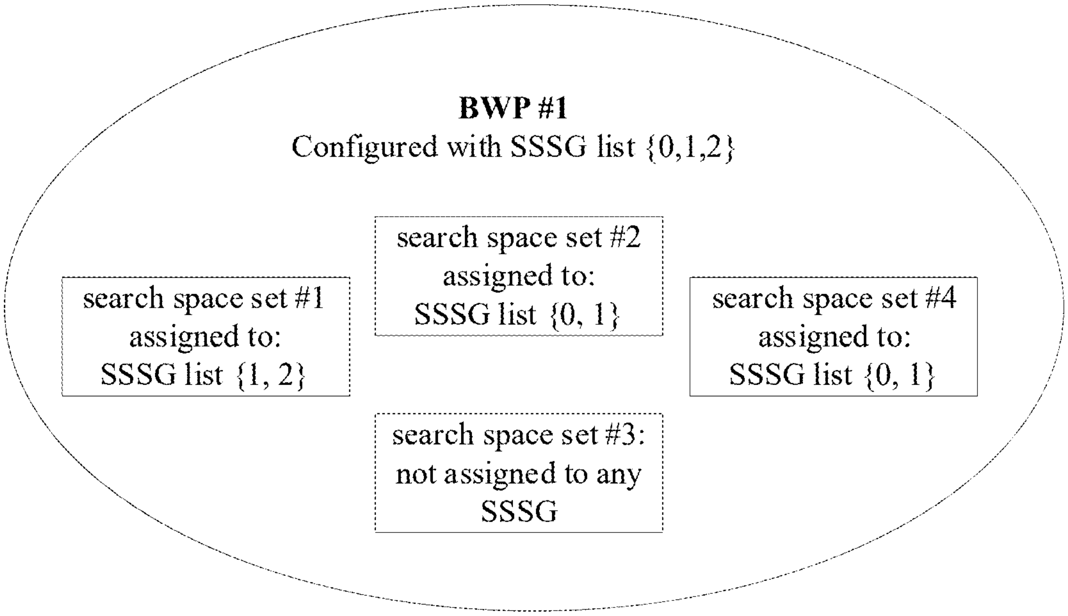
FIG. 6 shows exemplary BWP configured with a SSSG list.

In some embodiments, if PDCCH skipping duration list is not configured, and if SSSG list is configured, the bit-width may be determined according to one of the following:

Option 1:

The number of SSSGs (in the SSSG list) configured in one of: a BWP, or a serving cell, or a serving cell group in which the UE monitors the DCI or to which the indicated PDCCH monitoring behavior will apply. Referring to FIG. 6 for an example, there are 4 Search Space Sets (SSS) configured in BWP #1, with index from 1 to 4. SSS #1 is assigned to SSSG 1 and 2, SSS #2 is assigned to SSSG 0 and 1, SSS #4 is assigned to SSSG 0 and 1, and SSS #3 is not assigned to any SSSG. In this example, the SSSG list in BWP #1 contains {SSSG 0, SSSG 1, SSSG 2} and the number of SSSGs in the SSSG list is 3. The number of SSSGs in a BWP group, a serving cell, or a serving cell group may be derived similarly and is not described in detail herein.

As another example, assuming the number of SSSGs is A, the bit-width may be set to 1 if A is less than 3, and the bit-width may be set to 2 if A is equal to or larger than 3.

Option 2:

The number of SSSGs configured in a predefined BWP. In one implementation, the predefined BWP may be configured by RRC signaling. In one implementation, the predefined BWP may be the BWP with the lowest index among a group of BWPs that need to apply the PDCCH monitoring behavior indicated by the control signal. In one implementation, the predefined BWP may be the default BWP.

Option 3:

The maximum index of SSSGs (in the SSSG list) configured in one of: a BWP, or a serving cell, or a serving cell group in which the UE monitors the DCI or to which the indicated PDCCH monitoring behavior will apply. For example, there are 4 Search Space Sets (SSSs) configured in BWP #1, with index from 1 to 4. SSS #1 is assigned to SSSG 1 and 2, SSS #2 is assigned to SSSG 0 and 1, SSS #4 is assigned to SSSG 0 and 1, and SSS #3 is not assigned to any SSSG. In this example, the maximum index of SSSG is 2. As another example, assuming the maximum index of SSSGs is B, the bit-width may be set to 1 if B is less than 2, and the bit-width may be set to 2 if B is equal to or larger than 2.

In some embodiments, if PDCCH skipping duration list is configured, and if SSSG list is not configured, the bit-width may be determined according to one of the following:

Option 1:

The maximum number of PDCCH skipping durations configured in a PDCCH skipping duration list among all PDCCH skipping duration lists configured in one of: a set of SSSGs, a set of BWPs, a set of BWP groups, a set of serving cells, or a set of serving cell groups. A set may only contain one element.

In one implementation, a same indication via the control signal may apply to all the BWPs in a BWP group.

In one implementation, a same indication via the control signal may apply to all the serving cells in a serving cell group.

For example, referring to FIG. 4A, SkipDurationList 1 includes 3 durations, and SkipDurationList 2 includes 2 durations. In this case, the maximum number of PDCCH skipping durations is 3.

As another example, assuming that the maximum number of PDCCH skipping durations is A, the bit-width may be set to 1 if A less than 2, and the bit-width may be set to 2 if A is equal to or larger than 2.

Option 2:

The number of PDCCH skipping durations configured in a predefined BWP. In one implementation, the predefined BWP may be configured by RRC signaling. In one implementation, the predefined BWP may be the BWP with the lowest index among a group of BWPs that need to apply the PDCCH monitoring behavior indicated by the control signal. In one implementation, the predefined BWP may be the default BWP.

In some embodiments, if both PDCCH skipping duration list and SSSG list are configured, the bit-width may be set to 2.

PDCCH Monitoring Behavior Indication by Bitmap or Codepoint

In some embodiments, a codepoint or bitmap of a field in the control signaling may be used to indicate the PDCCH monitoring behavior. For example, the codepoint or bitmap carried in a DCI field.

In one implementation, referring to FIG. 4A as an example, if the PDCCH skipping duration list is configured per SSSG, and the SSSG list (e.g., the SSSG list contains SSSG #0 and SSSG #1) is also configured, the bit-width of the field may be set to 2.

In one implementation, still referring to FIG. 4A as an example, if there are 2 SSSGs in the SSSG list, and the number of PDCCH skipping durations in PDCCH skipping duration list corresponding to the 2 SSSGs is different, that is, the size of SkipDurationList 1 does not equal to the size of SkipDurationList 2, an exemplary codepoint interpretation is listed in Table 1 below:

TABLE 1

PDCCH Monitoring Behavior Mapping

| CodePoint | PDCCH monitoring behavior |
|---|---|
| 00 | SSSG switching to SSSG 0 |
| 01 | SSSG switching to SSSG 1 |
| 10 | PDCCH monitoring skipping for duration #1 if at least one duration is specified in the PDCCH skipping |

TABLE 1-continued

| PDCCH Monitoring Behavior Mapping | |
|---|---|
| CodePoint | PDCCH monitoring behavior |
| | duration list associated with the active SSSG. Otherwise, '10' is reserved. |
| 11 | PDCCH monitoring skipping for duration #2 if at least two durations are specified in the PDCCH skipping duration list associated with the active SSSG. Otherwise, '11' is reserved. |

In this implementation, the active SSSG may refer to the SSSG in which the UE monitors the DCI. As an example, based on Table 1 and referring to FIG. 4A, assuming SSSG #1 is active, if the size of SkipDurationList 2 is larger than or equal to 2, then the bitmap "11" indicates PDCCH monitoring skipping for duration #2 needs to be applies to SSSG #1. As another example, still assuming SSSG #1 is active, if the size of SkipDurationList 2 is less than 2, then the bitmap "11" is reserved.

In one implementation, there are 3 SSSGs in the SSSG list, and each SSSG in the list has an associated PDCCH skipping duration list. In some embodiments, a SSSG in the list may not be associated with a PDCCH skipping duration list. In another words, a SSSG in the list may be associated with zero PDCCH skipping duration. In a case where as least two PDCCH skipping duration lists having a different size, an exemplary codepoint interpretation is listed in Table 2 below:

TABLE 2

| PDCCH Monitoring Behavior Mapping | |
|---|---|
| CodePoint | PDCCH monitoring behavior |
| 00 | SSSG switching to SSSG 0 |
| 01 | SSSG switching to SSSG 1 |
| 10 | SSSG switching to SSSG 2 |
| 11 | PDCCH monitoring skipping for duration #1 if at least one duration is specified in the PDCCH skipping duration list associated with the active SSSG. Otherwise, '11' is reserved. |

Control Message Applies to BWP Group or Serving Cell Group

As described in above sections, the base station may send a control message to the UE to indicate a PDCCH monitoring behavior. The UE may in turn apply the indicated PDCCH monitoring behavior. For example, the UE may switch to another SSSG, or the UE may skip monitoring the PDCCH for a duration indicated by the control message. Description below uses DCI as an exemplary control message. However, the control message may be sent in other means.

In some embodiments, the UE may be configured with one or more serving cell groups, for example, via high layer signaling. Each serving cell group includes a set of serving cells. If UE receives a DCI indicates a PDCCH monitoring behavior in a serving cell associated with the serving cell group, the indicated PDCCH monitoring behavior may be applied to all serving cells in the same serving cell group. That is, a single DCI may serve all the serving cells in the serving cell group.

In some embodiments, in Carrier Aggregation (CA) mode, If UE receives a DCI indicates a PDCCH monitoring behavior in a serving cell in CA mode (or CA configuration), the indicated PDCCH monitoring behavior may also be applied to all serving cells associated in the same CA mode (or CA configuration).

In some embodiments, UE may be configured with same number and same types of PDCCH monitoring behavior for all the active downlink (DL) BWPs in a same serving cell group. For example, each active DL BWP may be associated with a list of PDCCH monitoring skipping durations of equal size. Referring to FIG. 4C, assuming BWP #0 and BWP #1 are both active DL BWPs with each in one serving cell, the size of SkipDurationList 1 and the size of SkipDurationList 2 are equal. For another example, each active DL BWP may be associated with a list of SSSGs of equal size.

In some embodiments, UE may be configured with same number of PDCCH monitoring behaviors for all the active DL BWPs in a same serving cell group. The number of PDCCH monitoring behaviors is the sum of PDCCH skipping durations and the number of SSSGs. For example, BWP #0 and BWP #1 are both active DL BWPs with each in one serving cell in a same serving cell group. BWP #0 is configured with 1 PDCCH skipping duration and 2 SSSGs, and BWP #2 is configured with 3 SSSGs. In this example, the total number of PDCCH monitoring behaviors is 3 for each of the BWP.

In some embodiments, the bit-width of the DCI field indicating the PDCCH monitoring behavior may be determined by the size of the PDCCH skipping duration list associated with the BWP, and/or the number of SSSGs in a DL BWP (or, the number of SSSGs in the SSSG list associated with the BWP). However, different DL BWPs in different serving cells may have different configurations (such as PDCCH skipping duration list and/or SSSG list), so depending on the BWP, the required bit-width for indicating PDCCH monitoring behavior may be different. The same concept also applies to serving cells. Table 3 below shows serving cell 1 and 2 in a serving cell group where these 2 serving cells having different PDCCH monitoring behavior configuration.

TABLE 3

| Serving Cells with Different PDCCH Monitoring Behavior Configuration | | |
|---|---|---|
| Serving cell ID | Serving cell 1 | Serving cell 2 |
| PDCCH monitoring behavior configuration | PDCCH skipping duration list: {3 slots, 4 slots}<br>SSSG list: {0, 1} | SSSG list {0, 1} |
| Required bit-width for indicating PDCCH monitoring behavior | Bit-width = 2 | Bit-width = 1 |
| DCI field codepoint interpretation | 00: SSSG switching to SSSG 0<br>01: SSSG switching to SSSG 1<br>10: first duration in PDCCH skipping duration list = 3 slots<br>11: second duration in PDCCH skipping duration list = 4 slots | 0: SSSG switching to SSSG 0<br>1: SSSG switching to SSSG 1 |

In this disclosure, to at least save control signaling overhead, various embodiments are disclosed, in which a single DCI field may indicate PDCCH monitoring behavior for multiple BWPs or multiple serving cells simultaneously, even these multiple BWPs or multiple serving cells are configured with different PDCCH monitoring behavior. One focus is how to interpret the same DCI field for different BWPs or different serving cells.

For example, serving cell 1, 2, 3, and 4 are configured in a serving cell group, UE receives a DCI indicating PDCCH monitoring behavior in serving cell 1, this indication may also apply to serving cell 2, 3, and 4. The ULE may interpret the DCI field according to the required bit-width that applies to different serving cell. In doing so, after receiving the DCI (and the DCI field indicating the PDCCH monitoring behavior), the UE may first need to adjust the bit-width of the DCI field to the required bit-width for the concerning serving cell, then the UE may interpret the indicated PDCCH monitoring behavior based on the adjusted bit-width.

In one implementation, if the bit-width of the DCI field in the received DCI in a first serving cell is larger than the required bit-width for PDCCH monitoring behavior interpretation for a second serving cell, there are several options for the UE to interpret the DCI field for the second serving cell:

Option 1:

A number of least significant bits of the DCI field equal to the required bit-width for indicating PDCCH monitoring behavior in the second serving cell is used.

Option 2:

A number of most significant bits of the DCI field equal to the required bit-width for indicating PDCCH monitoring behavior in the second serving cell is used.

Option 3:

If the indicated PDCCH monitoring behavior in the first serving cell is also available in the second serving cell, then the UE may also apply the same PDCCH monitoring behavior to the second serving cell. For example, if the indicated PDCCH monitoring behavior is to apply the second duration in the list of PDCCH monitoring skipping durations associated with the first serving cell, and there is also a second duration in the list of PDCCH monitoring skipping durations associated with the second serving cell, then the second duration is also applied to the second serving cell. On the other hand, if the indicated PDCCH monitoring behavior in the first serving cell is not available in the second serving cell, then the UE may not apply a PDCCH monitoring behavior.

In some embodiments, the first serving cell may be the Primary Cell (PCell). In some embodiments, the first serving cell may be the secondary Cell (SCell) which can schedule PCell. In some embodiments, the first serving cell may be the scheduling cell in cross-carrier scheduling. In some embodiments, the first serving cell may be a serving cell in the serving cell group. In some embodiments, the second serving cell may be the SCell. In some embodiments, the second serving cell may be the scheduled cell in cross-carrier scheduling. In some embodiments, the second serving cell may be the serving cells other than the first serving cell in the serving cell group.

The implementation above uses serving cells as an example. The same concept also applies to multiple SSSGs, multiple BWPs, multiple active BWPs, multiple BWP groups, or multiple serving cell groups.

In one implementation, if the bit-width of the DCI field in the received DCI in a first serving cell is less than the required bit-width for PDCCH monitoring behavior interpretation for a second serving cell, there are several options for the UE to interpret the DCI field for the second serving cell:

Option 1:

UE may prepend or append zeros to the DCI field until its size meets the required bit-width before interpreting the DCI field.

Option 2:

If the indicated PDCCH monitoring behavior in the first serving cell is also available in the second serving cell, then the UE may also apply the same PDCCH monitoring behavior to the second serving cell. On the other hand, if the indicated PDCCH monitoring behavior in the first serving cell is not available in the second serving cell, then the UE may not apply a PDCCH monitoring behavior.

PDCCH Monitoring Behavior Indication Using SCell Dormancy Indication Field or in DCI Format 2-6

Various DCI fields may be used for secondary Cell (SCell) dormancy indication, and these fields may be generally referred to as SCell dormancy indicator fields. These fields may include at least one of: a SCell dormancy indication field, a Modulation and coding scheme field, a New data indicator field, a Redundancy version field, a Hybrid automatic repeat request (HARQ) process number field, an Antenna port(s) field, and a Demodulation Reference Signal (DMRS) sequence initialization field. In one implementation, the bits from one or more of the aforementioned fields may be grouped together to form one or more data blocks, and these one or more data blocks may be used for indicating whether a SCell group switches to a dormant BWP. Specifically, each bit in the one or more data blocks formed by these SCell dormancy indication fields may be used to target a serving cell group. It is to be noted that the UE does not monitor PDCCH in a dormant BWP.

In some embodiments, if a condition is satisfied, these SCell dormancy indicator fields may be reused or repurposed to indicate PDCCH monitoring behavior. For example, if one-shot HARQ Acknowledgement (HARQ-ACK) request is not present or set to 0, and all bits of frequency domain resource assignment are set to 0 for resource allocation type 0, or set to 1 for resource allocation type 1; or set to 0 or 1 for dynamic switch resource allocation type.

In some embodiments, the condition may be associated with a Radio Network Temporary Identifier (RNTI), a Control Resource Set (CORESET), or a DCI format.

In some embodiments, when reusing these SCell dormancy indicator fields for indicating PDCCH monitoring behavior, the bit number used may be determined by a high layer signaling. In some embodiments, the bit number may be determined by the number of PDCCH skipping durations and/or the number of SSSGs configured in the PCell. In some embodiments, the PDCCH monitoring behavior indication is used to indicate a PDCCH monitoring behavior for a PCell. In some embodiments, the PDCCH monitoring behavior indication is used to indicate a PDCCH monitoring behavior for all serving cells in CA mode. In some embodiments, the PDCCH monitoring behavior indication is used to indicate a PDCCH monitoring behavior for all serving cells in a serving cell group.

In some embodiments, the bit number used for indicating PDCCH monitoring behavior may be determined by at least one of the following: the number of PDCCH skipping durations in each serving cell group, the maximum number of PDCCH skipping durations in a serving cell group, the required bit number for indicating PDCCH monitoring behavior in each serving cell group, the maximum SSSG ID number configured in the each serving cell group, the number of serving cell groups which are not in a dormancy BWP, and the number of SSSG configured in the each serving cell group. For example, the bit number is equal to the sum of the required bit number for indicating PDCCH monitoring behavior in each serving cell group. For another example, the bit number is based on at least the number of serving cell groups which are not in a dormancy BWP.

In some embodiments, PDCCH monitoring behavior indication and SCell dormancy indication may be combined or mixed by using the SCell dormancy indicator fields. For example, Table 4 below shows three serving cell groups, each serving cell group include one serving cell and the PDCCH monitoring configurations for each serving cell group are different. The indication may be in a "mixed" manner. That is, some bits in the SCell dormancy indicator fields are used to indicate SCell dormancy, and then the rest bits are used to indicate PDCCH monitoring behavior. In this example, 3 bits may be allocated to indicate SCell dormancy (one bit for each serving cell group), and 5 bits may be allocated to indicate PDCCH monitoring behavior.

TABLE 4

Mixed Indication Using SCell Dormancy Indicator Fields

| Serving cell group 1 | Serving cell group 2 | Serving cell group 3 |
|---|---|---|
| configured with 2 PDCCH skipping durations in a PDCCH skipping duration list | configured with two SSSGs in a SSSG list | configured with 2 PDCCH skipping durations in a PDCCH skipping duration list and two SSSGs in a SSSG list |
| Required bit PDCCH monitoring behavior indication = 2 bits | Required bit PDCCH monitoring behavior indication = 1 bit | Required bit PDCCH monitoring behavior indication = 2 bits |

In some embodiments, the bit number of each data block is configured by an RRC signaling. In some embodiments, the bit number of each data block is a predefined value.

In some embodiments, one serving cell group may be associated with a data block (as described above) if one or more PDCCH monitoring behavior is configured in the serving cell group. Each data block may include two bits which are used to indicate PDCCH monitoring behaviors. In some embodiments, if the bit number of the data block is larger than the required bit number for the indication, one of the following options may be taken:

Option 1:

UE uses a number of least significant bits of the data block equal to the required number of bits for indicating PDCCH monitoring behavior in the serving cell group.

Option 2:

UE uses a number of most significant bits of the data block equal to the required number of bits for indicating PDCCH monitoring behavior in the serving cell group.

Option 3:

If the indicated PDCCH monitoring behavior in the first serving cell group is also available in the second serving cell group, then the UE may also apply the same PDCCH monitoring behavior to the second serving cell group. For example, if the indicated PDCCH monitoring behavior is to apply the second duration in the list of PDCCH monitoring skipping durations associated with the first serving cell group, and there is also a second duration in the list of PDCCH monitoring skipping durations associated with the second serving cell group, then the second duration is also applied to the second serving cell group. On the other hand, if the indicated PDCCH monitoring behavior in the first serving cell group is not available in the second serving cell group, then the UE may not apply a PDCCH monitoring behavior.

UE may interpret the data block according to the configuration of the serving cell which receives the DCI. UE may apply the PDCCH monitoring behavior in the active DL BWP of the serving cell which receives the DCI. UE may further apply the same PDCCH monitoring behavior in the rest active BWPs in the serving cell group (i.e., the DCI is not received in these rest active DL BWPs), if the indicated PDCCH monitoring behavior is configured in these active BWPs. Otherwise the UE may not apply the PDCCH monitoring behavior if a particular active BWP does not have the PDCCH monitoring behavior configure.

In some embodiments, one serving cell group may be associated with a data block if one or more PDCCH monitoring behavior is configured in the serving cell group. Each data block includes one bit which is used to indicate PDCCH monitoring behavior. If the bit number of the data block for indicating PDCCH monitoring behavior is less than the required bit number indicating PDCCH monitoring behavior, UE may prepend or append zeros to the data block until the size meets the required bit number.

In some embodiments, the SCell dormancy indicator fields may be split into two groups: the first group to be used to indicate SCell dormancy, whereas the other group to be used to indicate PDCCH monitoring behavior.

The implementations above use SCell dormancy indicator field as an example. The same concept may also apply to one or more field used in a DCI of other formats, such DCI format 2-6 or other DCI.

In some embodiments, DCI format 2-6 may be used to indicate PDCCH monitoring behavior. In some embodiments, a new field in DCI format 2-6 may be used to indicate PDCCH monitoring adaptation. In some embodiments, one or more existing field DCI of DCI format 2-6 may be re-purposed to indicate PDCCH monitoring behavior. In some embodiments, a DCI format 2-6 with a specific RNTI may be used to indicate PDCCH monitoring behavior.

Timing and Delay for Applying PDCCH Monitoring Behavior—Embodiment 1

Once after the UE receives an indication or a trigger for a PDCCH monitoring behavior, the UE may apply the PDCCH monitoring behavior immediately, or with a delay. The indication may be carried in a control message or control signaling. The trigger may include a timer, such as an SSSG expire timer. In some embodiments, the delay is introduced to avoid interrupting an on-going task on the UE.

In some embodiments, the UE may apply the PDCCH monitoring behavior immediately after receiving the DCI (or any signal, or trigger that indicates the PDCCH monitoring behavior), for example, in the next slot after the slot the DCI is received, or the next symbol after the last symbol (i.e., orthogonal frequency-division multiplexing (OFDM) symbol) the DCI is received.

In some embodiments, the UE may apply the PDCCH monitoring behavior after a timer expires. For example, the UE may apply the PDCCH monitoring behavior the next symbol or slot after the last symbol or last slot of an SSSG switching timer expires. For another example, the UE may apply the PDCCH monitoring behavior after a predefined number of symbols or slots after the last symbol or last slot of an SSSG switching timer expires.

In some embodiments, the UE may apply the PDCCH monitoring behavior the next symbol or slot after the last slot or last symbol of the PDCCH transmission which carries the DCI indication. Alternatively, the UE may apply the PDCCH monitoring behavior after a predefined number of symbols or slots after the last slot or last symbol of the PDCCH transmission which carries the DCI indication.

In some embodiments, the UE may apply the PDCCH monitoring behavior after a last slot of PDCCH skipping duration. For example, the UE may apply the PDCCH monitoring behavior the next slot/symbol after the last slot/symbol of PDCCH skipping duration. For another example, the UE may apply the PDCCH monitoring behavior after a predefined number of symbols or slots after the last slot of PDCCH skipping duration.

In some embodiments, the UE may apply the PDCCH monitoring behavior after one of the following:

the last slot/symbol of an ACK transmission for acknowledging the Physical Downlink Share Channel (PDSCH) reception as indicated by the DCI;

the last slot/symbol of a Physical Uplink Share Channel (PUSCH) transmission scheduled by the DCI;

a slot of PUSCH transmission scheduled by the DCI;

a last slot or symbol of a time duration (X slots/symbols) after the time when the PDCCH monitoring behavior is indicated (e.g., by the control message) or triggered (e.g., by a timer), where X is a positive integer;

the last slot/symbol of a duration that has been skipped for PDCCH monitoring.

Different application condition may lead to different apply time to apply the PDCCH monitoring behavior. The slot or symbol to start or stop a PDCCH monitoring behavior may be determined according to one of the following options:

Option 1:

The UE may apply the PDCCH monitoring behavior in the n-th slot or symbol after the last DL slot/symbol which overlaps with an uplink (UL) slot/symbol for an associated ACK transmission or PUSCH transmission, where n is a positive integer. The ACK transmission may be the acknowledgement for the PDSCH decoding/reception indicated by the same control message which indicates the PDCCH monitoring behavior. In another example, ACK transmission may be the acknowledgement for DCI. The PUSCH transmission may be scheduled by the same control message which indicates the PDCCH monitoring behavior.

Figure 8:
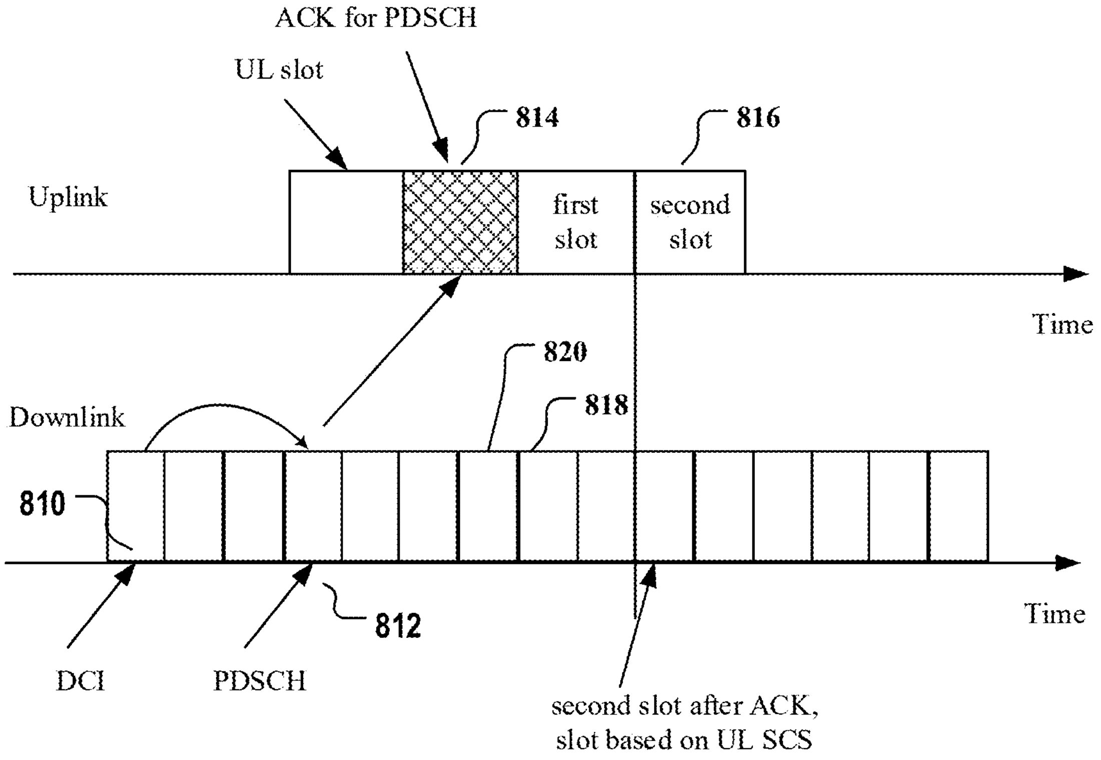
FIG. 8 shows an exemplary application delay for PDCCH monitoring behavior.

Referring to FIG. 8 for an example, the UE receives DCI 810 which both indicates a PDCCH monitoring behavior and schedules a PDSCH 812. The UE may first send an ACK 814 in response to the PDSCH 812 and then apply the PDCCH monitoring behavior at slot 818. In this example, slot 818 is the first slot after the last DL slot 820 which overlaps with the ACK 814.

Option 2:

The UE may apply the PDCCH monitoring behavior in the next slot or symbol after the last slot/symbol which overlaps with an associated UL slot/symbol. the UL slot/symbol may be an ACK transmission or a PUSCH transmission.

Option 3:

The UE may apply the PDCCH monitoring behavior in the first DL slot or DL symbol after the last slot/symbol of an associated UL transmission. The associated UL transmission may include an ACK transmission or a PUSCH transmission.

Option 4:

In some embodiments, the UE may apply the PDCCH monitoring behavior in the n-th DL slot or DL symbol after the last UL slot/symbol of an associated UL transmission, where n may be an integer less than 10. The UL slot/symbol may be for an ACK transmission or a PUSCH transmission.

Figure 7:
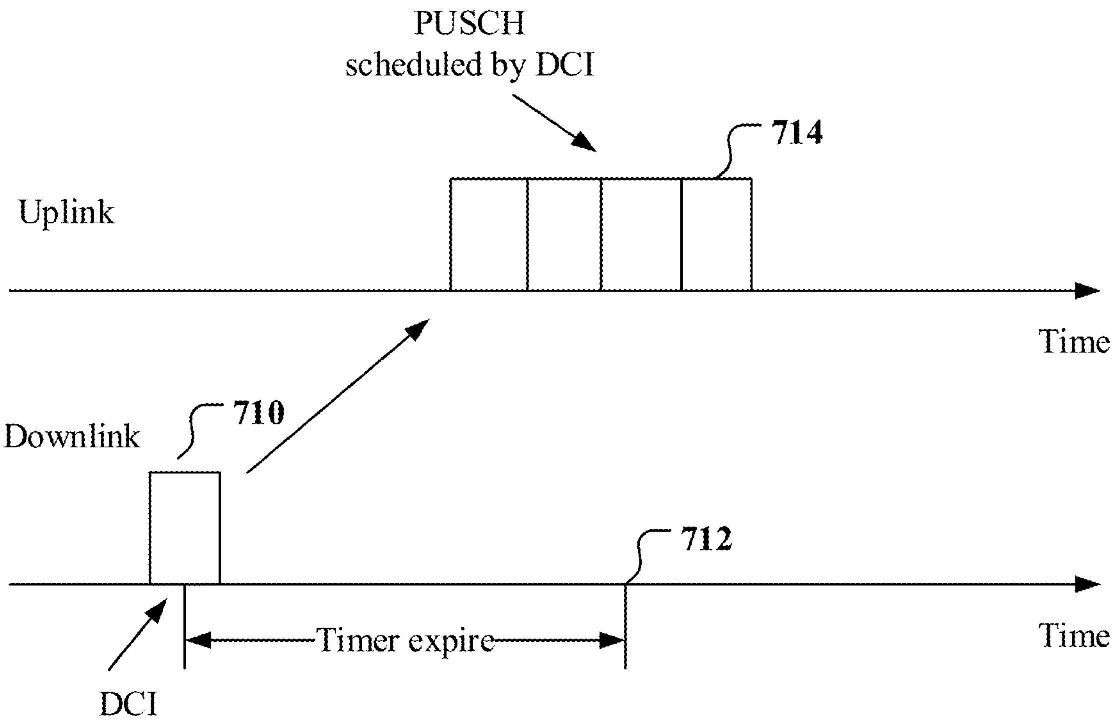
FIG. 7 shows exemplary time points to apply a UE PDCCH monitoring behavior.

Referring to FIG. 7, the UE receives the DCI indicating a PDCCH monitoring behavior at slot/symbol 710. In one implementation, the UE may apply the PDCCH monitoring behavior immediately, for example, in the next slot/symbol after 710. In one implementation, the UE may apply the PDCCH monitoring behavior at 712, after a timer expires. In one implementation, the DCI may also schedule a PUSCH transmission. The UE may apply the PDCCH monitoring behavior at 714, which is the last slot/symbol of the PUSCH transmission.

Figure 9:
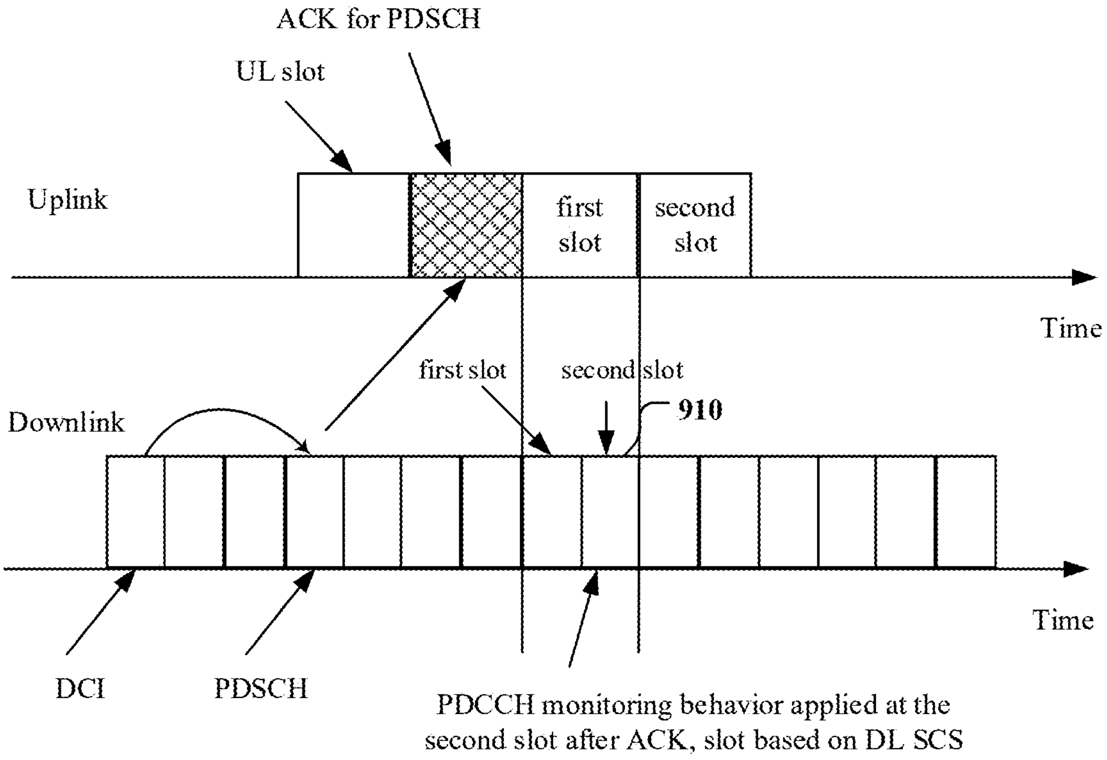
FIG. 9 shows another exemplary application delay PDCCH monitoring behavior.

Some examples are given with reference to FIGS. 8-9. Referring to FIG. 8, the UE receives DCI 810 which both indicates a PDCCH monitoring behavior and schedules a PDSCH 812. The UE may first send an ACK 814 in response to the PDSCH 812 and then apply the PDCCH monitoring behavior at the second slot 816 after the ACK. In one implementation, as shown in FIG. 8, the DL and the UL are configured with different sub-carrier spacing (SCS), and the length of UL slot (or symbol) and the length of DL slot (or symbol) is different. The PDCCH monitoring behavior application delay, when represented by slot or symbol, may be determined based on the SCS of the UL, i.e., slot 816 is based on UL SCS. In another implementation, as shown in FIG. 9, the PDCCH monitoring behavior is applied at slot 910, which is the second slot after the ACK for PDSCH, and slot 910 is based on DL SCS.

Subcarrier Spacing (SCS) Associated with Slot/Symbol

In some embodiments, an SCS is associated with the slot/symbol mentioned in the above section.

In some embodiments, the SCS is associated with at least one of the following:

SCS configuration of the PDCCH in which the PDCCH monitoring behavior indication is received;

SCS configuration of a PUCCH carrying the HARQ-ACK information in response to the PDSCH scheduled by the DCI;

SCS configuration of a PUCCH carrying the HARQ-ACK information in response to the DCI;

SCS configuration of a PUSCH scheduled by the DCI;

SCS configuration of a DL BWP in which the PDCCH monitoring behavior will be applied;

High layer configuration;

UE capability.

In some embodiments, the SCS may be determined as the smallest SCS configuration between the SCS configuration of the PDCCH in which the PDCCH monitoring behavior indication is received, and the SCS configuration of a PUCCH carrying the HARQ-ACK information in response to the PDSCH scheduled by the DCI, if the DCI format is 1-1 or 1-2 and the DCI carries a DL assignment.

In some embodiments, the SCS may be determined as the smallest SCS configuration between the SCS configuration of the PDCCH in which the PDCCH monitoring behavior indication is received, and the SCS configuration of a PUCCH carrying the HARQ-ACK information in response to the DCI.

In some embodiments, the SCS may be determined as the smallest SCS configuration between the SCS configuration of the SCS configuration of the PDCCH in which the PDCCH monitoring behavior indication is received, and the SCS configuration of a PUSCH scheduled by the DCI, if the DCI format is 0-1 or 0-2.

In some embodiments, the SCS may be determined as the largest SCS configuration between the SCS configuration of the SCS configuration of the PDCCH in which the PDCCH monitoring behavior indication is received, and the SCS configuration of a PUCCH carrying the HARQ-ACK information in response to the PDSCH scheduled by the DCI, if the DCI format is 1-1 or 1-2.

In some embodiments, the SCS may be determined as the largest SCS configuration between the SCS configuration of the PDCCH in which the PDCCH monitoring behavior indication is received, and the SCS configuration of a PUCCH carrying the HARQ-ACK information in response to the DCI.

In some embodiments, the SCS may be determined as the largest SCS configuration between the SCS configuration of the SCS configuration of the PDCCH in which the PDCCH monitoring behavior indication is received, and the SCS configuration of a PUSCH scheduled by the DCI, if the DCI format is 0-1 or 0-2.

In some embodiments, the SCS may be determined based on the SCS configuration of the SCS configuration of the PDCCH in which the PDCCH monitoring behavior indication is received.

In some embodiments, the SCS may be determined based on the SCS configuration of a PUCCH carrying the HARQ-ACK information in response to the PDSCH scheduled by the DCI, if the DCI format is 1-1 or 1-2 and the DCI carries a DL assignment.

In some embodiments, the SCS may be determined based on the SCS configuration of a PUCCH carrying the HARQ-ACK information in response to the DCI format without DL scheduling.

In some embodiments, the SCS may be determined based on the SCS configuration of a PUSCH scheduled by the DCI, if the DCI format is 0-1 or 0-2.

In some embodiments, the SCS may be determined as the the smallest SCS configuration of a DL BWP in which the PDCCH monitoring behavior will be applied, and the SCS configuration of a PUCCH carrying the HARQ-ACK information in response to the PDSCH scheduled by the DCI, if the DCI format is 1-1 or 0-1 the DCI carries a DL assignment.

In some embodiments, the SCS may be determined as the the smallest SCS configuration of a DL BWP in which the PDCCH monitoring behavior will be applied, and the SCS configuration of a PUCCH carrying the HARQ-ACK information in response to the DCI.

In some embodiments, the SCS may be determined as the smallest SCS configuration of the DL BWP in which the PDCCH monitoring behavior adaptation will be applied, and the SCS configuration of a PUSCH scheduled by the DCI, if the DCI format is 0-1 or 0-2.

In some embodiments, the SCS may be determined as the smallest SCS configuration of DL BWPs among a set of DL BWPs in which the PDCCH monitoring behavior adaptation will be applied.

In some embodiments, the SCS may be determined as the largest SCS configuration of the DL BWPs in which the PDCCH monitoring behavior adaptation will be applied.

In some embodiments, the SCS may be determined based on at least a high layer configuration. For example, a high layer signaling may configure a reference SCS to the UE. The SCS may be the same as the reference SCS. For another example, the SCS may be determined as the the smallest SCS configuration of the reference SCS and the SCS configuration of the PDCCH in which the PDCCH monitoring behavior indication is received. For another example, the SCS may be determined as the smallest SCS configuration of the reference SCS, the SCS configuration of the PDCCH in which the PDCCH monitoring behavior indication is received, and the SCS configuration of a PUCCH carrying the HARQ-ACK information in response to the PDSCH scheduled by the DCI or the HARQ-ACK information in response to the DCI. For another example, the SCS may be determined as the smallest SCS configuration of the reference SCS, the SCS configuration of the PDCCH in which the PDCCH monitoring behavior indication is received, and the SCS configuration of a PUSCH scheduled by the DCI.

In some embodiments, the SCS may be determined based on at least a UE assistance information. The UE assistance information may report a SCS configuration, and the SCS may be the same as the SCS configuration reported by UE assistance information. For example, the SCS may be determined as the smallest SCS configuration of the SCS reported by UE assistance information, the SCS configuration of the PDCCH in which the PDCCH monitoring behavior indication is received, and the SCS configuration of a PUSCH scheduled by the DCI. For another example, the SCS may be determined as the smallest SCS configuration of the SCS reported by UE assistance information, the SCS configuration of the PDCCH in which the PDCCH monitoring behavior indication is received, and the SCS configuration of a PUCCH carrying the HARQ-ACK information in response to the PDSCH scheduled by the DCI or the HARQ-ACK information in response to the DCI.

In some embodiments, the SCS may be determined based on the SCS configuration of the lowest or highest index DL BWP among a set of BWPs in which the PDCCH monitoring behavior will be applied. In some embodiments, the SCS may be determined based on the SCS configuration of the default BWP. In some embodiments, the default BWP is BWP #0 (BWP with index 0).

Timing and Delay for Applying PDCCH Monitoring Behavior—Embodiment 2

In some embodiments, after receiving an indication for applying a PDCCH monitoring behavior, a delay may need to be introduced from the indication receiving time point to the PDCCH monitoring behavior effectuation time point. The delay may be determined based on an application condition. Different conditions may lead to different delays. Specifically, the application condition may be associated with at least one of:

- a DCI format of the DCI indicating the PDCCH monitoring behavior;
- a PDCCH monitoring behavior indication;
- a high layer signaling;
- a minimum applicable scheduling offset indicator;
- a minimum scheduling offset;
- an SCell dormancy indication;
- UE capability;
- a timer; or
- a BWP indicator.

In one implementation, the minimum applicable scheduling offset indicator is used to indicate minimum applicable K0 for the active DL BWP and the minimum applicable K2 value for the active UL BWP, if configured respectively.

In one implementation, the minimum applicable scheduling offset may include minimum applicable K0, minimum applicable K2, and minimum applicable CSI-RS triggering offset. The minimum applicable K0 is defined as minimum slot offset between a DCI and its scheduled PDSCH. The minimum applicable K2 is defined as minimum slot offset between a DCI and its scheduled PUSCH.

In one implementation, a PDCCH transmission may carry a DCI indicating the PDCCH monitoring behavior. The DCI may simultaneously schedule a PUSCH transmission, or a PUCCH transmission. The DCI may also indicate a PDSCH transmission scheduling. After the UE successfully receives the PDSCH transmission, the UE may send an acknowledgement (ACK) to the base station. The PDCCH monitoring behavior (e.g., PDCCH skipping duration and/or SSSG switching) may be applied in following manners:

- the UE applies the indicated/triggered PDCCH monitoring behavior on the serving cell at the first slot after the last OFDM symbol of the PDCCH transmission;
- the UE applies the indicated/triggered PDCCH monitoring behavior X slot after the last OFDM symbol of the ACK transmission, otherwise (i.e., Non Acknowledge (NACK)) the indication is not applied, where X is a positive integer and less than 30;
- the UE applies the indicated/triggered PDCCH monitoring behavior on the serving cell at the U-th slot after the last OFDM symbol of PUSCH transmission. Where U is a positive integer and less than 30. For one example, U-th=first. For another example, U may be configured by RRC signaling. For another example, U may be reported by UE. For yet another example, U may be a predefined value;
- the UE applies the indicated/triggered PDCCH monitoring behavior on the serving cell at the first slot after the last OFDM symbol of the PDCCH transmission. If the UE fails to decode the associated PDSCH and/or transmits an NACK, UE may perform original PDCCH monitoring behavior (i.e., the PDCCH monitoring skipping is stopped, or PDCCH monitoring skipping will not be applied) at the first slot after the last OFDM symbol of the NACK transmission;
- the UE applies the indicated/triggered PDCCH monitoring behavior on the serving cell at the first slot after the last OFDM symbol of the PDCCH transmission, and DL HARQ retransmission during the skipping duration is handled by RTT/ReTx timers;
- the UE applies the indicated/triggered PDCCH monitoring behavior on the serving cell at the first slot after the last OFDM symbol of the PDCCH transmission, and UL HARQ retransmission during the skipping duration is handled by RTT/ReTx timers;
- the UE applies the indicated/triggered PDCCH monitoring behavior on the serving cell after the application delay of minimum scheduling offset restriction;
- the UE applies the indicated/triggered PDCCH monitoring behavior on the serving cell at the first slot after Pswitch. In one implementation, Pswitch may represent time related to switching between Transmission (TX) and Reception (RX) operations. Pswitch may be predefined for each SCS.

In some embodiments, the application condition may include at least UE capability. In some embodiments, the UE capability may include UE processing capability. For example, if UE capability is 1, UE applies the PDCCH monitoring behavior at the slot after ACK transmission associated with the DCI if the DCI format is 1-1 or 1-2, or UE applies the PDCCH monitoring at the slot after PUSCH transmission if the DCI format is 0-1 or 0-2. If UE processing capability is 2, UE applies the PDCCH monitoring adaptation at the first slot after the slot in which the DCI is received.

In some embodiments, the application condition may include at least one of: a DCI format, or a minimum applicable scheduling offset indicator. As described earlier, the DCI may simultaneously schedule a PUSCH transmission, or a PUCCH transmission. The DCI may also indicate a PDSCH transmission scheduling. After the UE receives the PDSCH transmission, the UE may send an acknowledgement (ACK) to the base station.

In one implementation, the UE detects a scheduling DCI format 1-1 or 1-2 indicating a PDCCH monitoring behavior, if the PDSCH decoding/reception is successful, the UE may apply the indicated/triggered PDCCH monitoring behavior X slot after the last OFDM symbol of the ACK transmission, otherwise (e.g., decoding un-successful and an NACK is transmitted) the indication is not applied. X is a positive integer. For example, X=1. For another example, X may be configured by RRC signaling. For another example, X may be reported by UE. For another example, X may be a predefined value.

In one implementation, if a UE detects a scheduling DCI format 0-1 or 0-2 indicating a PDCCH monitoring behavior, the PDCCH monitoring behavior (e.g., PDCCH skipping duration and/or SSSG switching) may be applied in following manners:

Option 1:

The UE applies the indicated/triggered PDCCH monitoring behavior on the serving cell after the application delay of minimum scheduling offset restriction if minimum applicable scheduling offset indicator field is present in the DCI, otherwise (e.g., minimum applicable scheduling offset indicator field is not present), the UE applies the indicated/triggered PDCCH monitoring behavior on the serving cell at the first slot after the last OFDM symbol of the PDCCH transmission.

Option 2:

The UE applies the indicated/triggered PDCCH monitoring behavior on the serving cell after the application delay of minimum scheduling offset restriction if minimum applicable scheduling offset indicator field indicates minimum scheduling offset change, otherwise (e.g., minimum scheduling offset does not change), the UE applies the indicated/triggered PDCCH monitoring behavior on the serving cell at the first slot after the last OFDM symbol of the PDCCH transmission.

Option 3:

The UE applies the indicated/triggered PDCCH monitoring behavior on the serving cell after the application delay of minimum scheduling offset restriction if minimum applicable scheduling offset indicator presents in the DCI, otherwise (e.g., minimum applicable scheduling offset indicator does not present), the UE applies the indicated/triggered PDCCH monitoring behavior on the serving cell at the Y-th slot/symbol after the last OFDM symbol of the PDCCH transmission. Y is a positive integer. For example, Y-th=first. For another example, Y may be configured by RRC signaling. For another example, Y may be reported by UE. For another example, Y may be a predefined value.

Option 4:

The UE applies the indicated/triggered PDCCH monitoring behavior on the serving cell after the application delay of minimum scheduling offset restriction if minimum applicable scheduling offset indicator indicates minimum scheduling offset change, otherwise (e.g., minimum scheduling offset does not change), the UE applies the indicated/ triggered PDCCH monitoring behavior on the serving cell at the Y-th slot/symbol after the last OFDM symbol of the PDCCH transmission. Y is a positive integer. For example, Y-th=first. For another example, Y may be configured by RRC signaling. For another example, Y may be reported by UE. For another example, Y is a predefined value.

In some embodiments, as described earlier, a PDCCH transmission may carry a DCI indicating the PDCCH monitoring behavior. The DCI may simultaneously schedule a PUSCH transmission, or a PUCCH transmission. The DCI may also indicate a PDSCH transmission scheduling. After the UE receives the PDSCH transmission, the UE may send an acknowledgement (ACK) to the base station. The application condition for applying the PDCCH monitoring behavior includes at least one of: a DCI format of the DCI, a high layer signaling, or PDCCH monitoring behavior indication.

UE may determine a PDCCH skipping duration or a SSSG ID according to the PDCCH monitoring behavior indication and a high layer signaling which configures a PDCCH skipping duration list and/or a SSSG ID list.

For example, if the indicated PDCCH skipping duration is less than a threshold, UE may apply the indicated/triggered PDCCH monitoring behavior on the serving cell at the first slot/symbol after the last OFDM symbol of the PDCCH transmission which carries the DCI indicating the PDCCH monitoring behavior. Otherwise, the UE applies the indicated/triggered PDCCH monitoring behavior on the serving cell the first slot after the last OFDM symbol of ACK transmission.

In some embodiments, the application condition for applying the PDCCH monitoring behavior includes at least one of: a DCI format of the DCI, application delay of minimum scheduling offset, or K2.

For example, the UE detects a scheduling DCI format 1-1 or 1-2 indicating a PDCCH monitoring behavior, if the UE transmits an ACK for the PDSCH scheduled by the DCI, the UE applies the indicated/triggered PDCCH monitoring behavior X slot after the last OFDM symbol of the ACK transmission, otherwise (e.g., NACK) the indication is not applied. X is positive integer. For example, X=1. For another example, X may be configured by an RRC signaling. For another example, X may be reported by UE. For another example, X may be a predefined value.

For another example, when the UE detects a scheduling DCI with format 0-1 or 0-2 indicating a PDCCH monitoring behavior, the UE may apply the indicated/triggered PDCCH monitoring behavior on the serving cell after a first value, the first value is calculated by a mathematical operation (such as minimum operation: a minimum applicable scheduling offset restriction (e.g., K2), the application delay of minimum applicable scheduling offset restriction) if minimum applicable scheduling offset indicator presents in the DCI, otherwise (e.g., minimum applicable scheduling offset indicator does not present), the UE may apply the indicated/triggered PDCCH monitoring behavior on the serving cell at the first slot after the PUSCH transmission. The mathematical operation may include: select maximum, select minimum, or addition.

In some embodiments, the DCI which indicates PDCCH monitoring behavior adaptation may also include a SCell dormancy indication and the indicated PDCCH monitoring behavior will be applied to all the serving cells in the CA mode. The UE will apply the indicated/triggered PDCCH monitoring behavior after finish switching to non-dormant BWP for each Scell which the each Scell is indicated to do so. The UE will apply the indicated/triggered PDCCH monitoring behavior the X-th slot after the PDCCH transmission for each scell which does not need to perform BWP switching. X is a positive integer.

In some embodiments, the SSSG switch timer is configured if SSSG #2 is configured.

In some embodiments, the SSSG switch timer is configured and associated with SSSG #2.

In some embodiments, the prerequisite for supporting SSSG timer based PDCCH monitoring behavior triggering is that the UE supports to be configured with 3 SSSGs.

In some embodiments, if searchSpaceGroupIdList is configured, UE is not expected to be configured with a second SSSG list for a second procedure or a PDCCH skipping duration list. In some embodiments, if a search space group switching feature is used, UE is not expected to be configured with a second SSSG list for a second procedure or a PDCCH skipping duration list.

In some embodiments, UE may apply the indicated/triggered PDCCH monitoring behavior after an application delay if the PDCCH monitoring behavior is changed.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution may be practiced without one or more of the specific features or advantages of a particular embodiment. In other instances, additional features and advantages may be recognized in certain embodiments that may not be present in all embodiments of the present solution.

The invention claimed is:

1. A method performed by a User Equipment (UE) in a wireless network, comprising:

receiving, from a wireless communication node in the wireless network, a configuration message comprising configuration information associated with a Physical Downlink Control Channel (PDCCH) monitoring behavior set;

receiving, from the wireless communication node, a control message indicating a PDCCH monitoring behavior in the PDCCH monitoring behavior set; and determining a PDCCH monitoring behavior based on the control message, wherein the control message indicates the PDCCH monitoring behavior in the PDCCH monitoring behavior set via a field in the control message;

wherein the method further comprises determining a bit width of the field;

wherein the control message is received from a first serving cell in a serving cell group, and the method further comprises:

applying a first PDCCH monitoring behavior in the first serving cell according to the field; and applying a second PDCCH monitoring behavior in a second serving cell in the serving cell group according to the field;

wherein applying the second PDCCH monitoring behavior in the second serving cell in the serving cell group according to the field comprises one of the following:

in response to a bit-width of the field being larger than a target bit-width required for indicating a PDCCH monitoring behavior for the second serving cell: obtaining a target field by truncating the field to the target bit-width; and applying the second PDCCH monitoring behavior in the second serving cell according to the target field;

or in response to a bit-width of the field being less than a target bit-width required for indicating a PDCCH monitoring behavior for the second serving cell: prepending or appending 0 to the field to obtain a target field with the target bit-width; and applying the second PDCCH monitoring behavior in the second serving cell according to the target field.

2. The method of claim 1, wherein the control message comprises a Downlink Control Information (DCI) message or a timer;

wherein the configuration message comprises a Radio Resource Control (RRC) message;

wherein the PDCCH monitoring behavior set comprises at least one of:

at least one list of PDCCH monitoring skipping durations; and at least one list of Search Space Set Groups (SSSGs).

3. The method of claim 2 wherein each list of PDCCH monitoring skipping durations from the at least one list of PDCCH monitoring skipping durations is associated with a SSSG in the at least one list of SSSGs;

wherein the at least one list of SSSGs is associated with at least one of: a Bandwidth Part (BWP), a serving cell, or a serving cell group; and each of the list of PDCCH monitoring skipping durations has a same number of PDCCH monitoring skipping durations.

4. The method of claim 2, wherein the PDCCH monitoring behavior applies to one of:

all serving cells in a serving cell group;

all downlink (DL) BWPs in a BWP group configured in the UE;

all DL BWPs configured in the UE;

all non-dormant DL BWPs in the serving cell group;

all non-dormant DL BWPs configured in the UE; or all active DL BWPs configured in the serving cell group.

5. The method of claim 4, herein:

in response to the control message indicating an SSSG ID, the PDCCH monitoring behavior applies to one of:

all the serving cells in the serving cell group;

all the active DL BWPs configured in the serving cell group; or all the DL BWPs configured in the UE; and in response to the control message indicating a PDCCH monitoring skipping duration, the PDCCH monitoring behavior applies to a BWP indicated by the control message;

wherein in response to the following being satisfied, the PDCCH monitoring behavior applying to all the active DL BWPs configured in the serving cell group:

each of the active DL BWPs is associated with at least one of:

a target list of PDCCH monitoring skipping durations from the at least one list of PDCCH monitoring skipping durations; or a target list of SSSGs from the at least one list of SSSGs;

each of the target list of PDCCH monitoring skipping durations has a same number of PDCCH monitoring skipping durations; and each of the target list of SSSGs has a same number of SSSGs; or wherein in response to the following being satisfied, the PDCCH monitoring behavior applies to all the active DL BWPs configured in the serving cell group:

each of the active DL BWPs is associated with at least one of:

a target list of PDCCH monitoring skipping durations from the at least one list of PDCCH monitoring skipping durations; or a target list of SSSGs from the at least one list of SSSGs; and each of the active DL BWPs is associated with a same number of PDCCH monitoring behaviors which is a sum of a number of PDCCH monitoring skipping durations in the target list of PDCCH monitoring skipping durations and a number of SSSGs in the target list of SSSGs.

6. The method of claim 1, wherein determining the PDCCH monitoring behavior based on the control message comprises:

determining the PDCCH monitoring behavior based on the field in the control message and a bit width of the field.

7. The method of claim 1, wherein:

the PDCCH monitoring behavior set is configured in a BWP, a BWP group, or a serving cell group;

the PDCCH monitoring behavior set does not comprise at least one list of PDCCH monitoring skipping durations; and determining the bit width of the field comprises determining the bit width of the field based on one of:

a number of SSSGs in a target list of SSSGs from at least one list of SSSGs, the target list of SSSGs having the maximum number of SSSGs among all lists in the at least one list of SSSGs;

a high layer signaling;

a number of SSSGs in the BWP, the BWP group, or the serving cell group;

a maximum SSSG ID number among the SSSGs in the BWP, the BWP group, or the serving cell group;

a number of SSSGs in a predefined BWP; or

A maximum SSSG ID number among the SSSGs in a predefined BWP;

wherein the predefined BWP is determined by:

an RRC signaling;

a default BWP; or a BWP with a lowest index in a BWP group.

8. The method of claim 1, wherein:

the PDCCH monitoring behavior set is configured in a BWP, a BWP group, or a serving cell group;

the PDCCH monitoring behavior set does not comprise at least one list of SSSGs;

at least one list of PDCCH monitoring skipping durations is associated with one of: a list of SSSGs, a BWP, a BWP group, or a serving cell group; and determining the bit width of the field comprises determining the bit width of the field based on one of:

a number of PDCCH monitoring skipping durations in a target list of PDCCH monitoring skipping durations from the at least one list of PDCCH monitoring skipping durations, the target list of PDCCH monitoring skipping durations having a maximum number of PDCCH monitoring skipping durations among all lists in the at least one list of PDCCH monitoring skipping durations;

a high layer signaling; or a number of PDCCH monitoring skipping durations configured in a predefined BWP;

wherein the predefined BWP is determined by:

an RRC signaling;

a default BWP; or a BWP with a lowest index in a BWP group.

9. The method of claim 1, wherein the field indicates one of following PDCCH monitoring behaviors:

switching to a target SSSG indicated by the field;

skipping PDCCH monitoring for a PDCCH monitoring skipping duration indicated by the field, the PDCCH monitoring skipping duration being in a target list of PDCCH monitoring skipping durations from at least one list of PDCCH monitoring skipping durations, and the target list of PDCCH monitoring skipping durations being associated with an active SSSG; or determining that a value of the field is reserved.

10. The method of claim 1, wherein obtaining the target field by truncating the field to the target bit-width comprises:

truncating the field from Most Significant Bit (MSB) or Least Significant Bit (LSB) of the field, to obtain the target field.

11. The method of claim 1, wherein a bit-width of the field being not equal to a target bit-width required for indicating a PDCCH monitoring behavior for the second serving cell, and applying the second PDCCH monitoring behavior in the second serving cell according to the field comprises:

in response to the first PDCCH monitoring behavior is configured in the second serving cell, applying the first PDCCH monitoring behavior in the second serving cell.

12. The method of claim 1 further comprising:

applying the PDCCH monitoring behavior.

13. The method of claim 12, wherein applying the PDCCH monitoring behavior comprises:

determining a time point to apply the PDCCH monitoring behavior; and applying the PDCCH monitoring behavior in an immediate next slot or an immediate next symbol after the time point;

wherein the time point comprises one of:

a slot in which the control message is received;

a last symbol in which the control message is received;

an n-th slot or symbol after the PDCCH monitoring behavior is indicated or triggered, n being a positive integer;

a last slot in which an SSSG switching timer expires;

a last symbol in which an SSSG switching timer expires;

a last symbol of an Acknowledgement (ACK) transmission associated with the control message;

a last DL slot that overlaps with a PUSCH transmission associated with the control message;

a m-th slot after the last DL slot that overlaps with the PUSCH transmission associated with the control message, m being a positive integer;

a last DL slot that overlaps with an ACK transmission associated with the control message;

a 1-th slot after the last DL slot that overlaps with the ACK transmission associated with the control message, 1 being a positive integer; or a last symbol of a Physical Uplink Shared Channel (PUSCH) transmission scheduled by the control message; or a last slot of a PDCCH monitoring skipping duration that the UE is currently applying;

wherein the time point is represented by a slot or a symbol, the slot or the symbol is based a sub-carrier spacing (SCS), and the SCS is determined based on at least one of:

an SCS configuration of a PDCCH which carries the control message;

an SCS configuration of the ACK transmission;

an SCS configuration of a PUSCH scheduled by the control message;

an SCS configuration of a Downlink (DL) BWP in which the PDCCH monitoring behavior is to be applied;

a smallest SCS configuration among all DL BWPs in which the PDCCH monitoring behavior adaptation is to be applied;

an SCS configuration of a lowest index DL BWP in which the PDCCH monitoring behavior adaptation is to be applied;

a higher layer configuration; or a UE capability;

or wherein applying the PDCCH monitoring behavior comprise at least one of:

applying the PDCCH monitoring behavior at a m-th slot after the last DL slot that overlaps with the PUSCH transmission associated with the control message, m being a positive integer;

applying the PDCCH monitoring behavior in an immediate next DL slot after the PUSCH transmission associated with the control message, the immediate next DL slot being associated with a BWP in which the PDCCH monitoring behavior is to be applied;

applying the PDCCH monitoring behavior in a n-th slot after the last DL slot that overlaps with the ACK transmission associated with the control message, n being a positive integer; or applying the PDCCH monitoring behavior in an immediate next DL slot after the ACK transmission associated with the control message, the immediate next DL slot being associated with a BWP in which the PDCCH monitoring behavior adaptation is to be applied.

14. A method performed by a wireless communication node in a wireless network, comprising:

transmitting, to a UE in the wireless network, a configuration message comprising configuration information associated with a Physical Downlink Control Channel (PDCCH) monitoring behavior set; and transmitting, to a UE in the wireless network, a control message indicating a PDCCH monitoring behavior in the PDCCH monitoring behavior set, wherein the control message triggers the UE to determine a PDCCH monitoring behavior based on the control message, the control message indicates the PDCCH monitoring behavior in the PDCCH monitoring behavior set via a field in the control message;

wherein the method further comprises determining a bit width of the field; the control message is transmitted via a first serving cell in a serving cell group;

the control message triggers the UE to apply a first PDCCH monitoring behavior in the first serving cell according to the field, wherein in response to a bit-width of the field being larger than a target bit-width required for indicating a PDCCH monitoring behavior for a second serving cell, a target field is obtained by truncating the field to the target bit-width; and the second PDCCH monitoring behavior is applied in the second serving cell according to the target field; and the control message triggers the UE to apply a second PDCCH monitoring behavior in the second serving cell in the serving cell group according to the field, wherein in response to a bit-width of the field being less than a target bit-width required for indicating a PDCCH monitoring behavior for the second serving cell, 0 is prepended or appended to the field to obtain a target field with the target bit-width, and the second PDCCH monitoring behavior is applied in the second serving cell according to the target field.

15. The method of claim 14, wherein the control message comprises a Downlink Control Information (DCI) message or a timer;

wherein the configuration message comprises a Radio Resource Control (RRC) message;

wherein the PDCCH monitoring behavior set comprises at least one of:

at least one list of PDCCH monitoring skipping durations; and at least one list of Search Space Set Groups (SSSGs);

wherein each list of PDCCH monitoring skipping durations from the at least one list of PDCCH monitoring skipping durations is associated with a SSSG in the at least one list of SSSGs;

wherein the at least one list of SSSGs is associated with at least one of: a Bandwidth Part (BWP), a serving cell, or a serving cell group; and each of the list of PDCCH monitoring skipping durations has a same number of PDCCH monitoring skipping durations.

16. The method of claim 15, wherein the PDCCH monitoring behavior applies to one of:

all serving cells in a serving cell group associated with the UE;

all downlink (DL) BWPs in a BWP group configured in the UE;

all DL BWPs configured in the UE;

al non-dormant DL BWPs in the serving cell group;

all non-dormant DL BWPs configured in the UE; or all active DL BWPs configured in the serving cell group, wherein in response to the control message indicating an SSSG ID, the PDCCH monitoring behavior applies to one of:

all the serving cells in the serving cell group;

all the active DL BWPs configured in the serving cell group; or all the DL BWPs configured in the UE; and in response to the control message indicating a PDCCH monitoring skipping duration, the PDCCH monitoring behavior applies to a BWP indicated by the control message;

wherein in response to the following being satisfied, the PDCCH monitoring behavior applies to all the active DL BWPs configured in the serving cell group;

each of the active DL BWPs is associated with at least one of:

a target list of PDCCH monitoring skipping durations from the at least one list of PDCCH monitoring skipping durations; or a target list of SSSGs from the at least one list of SSSGs;

each of the target list of PDCCH monitoring skipping durations has a same number of PDCCH monitoring skipping durations; and each of the target list of SSSGs has a same number of SSSGs; or wherein in response to the following being satisfied, the PDCCH monitoring behavior applies to all the active DL BWPs configured in the serving cell group;

each of the active DL BWPs is associated with at least one of:

a target list of PDCCH monitoring skipping durations from the at least one list of PDCCH monitoring skipping durations; or a target list of SSSGs from the at least one list of SSSGs; and each of the active DL BWPs is associated with a same number of PDCCH monitoring behaviors which is a sum of a number of PDCCH monitoring skipping durations in the target list of PDCCH monitoring skipping durations and a number of SSSGs in the target list of SSSGs.

17. The method of claim 14, wherein determining the PDCCH monitoring behavior based on the control message comprises:

determining the PDCCH monitoring behavior based on the field in the control message and the bit width of the field.

18. The method of claim 14, wherein:

the PDCCH monitoring behavior set is configured in a BWP associated with the UE, a BWP group associated with the UE, or a serving cell group associated with the UE;

the PDCCH monitoring behavior set does not comprise at least one list of PDCCH monitoring skipping durations; and determining the bit width of the field comprises determining the bit width of the field based on one of:

a number of SSSGs in a target list of SSSGs from at least one list of SSSGs, the target list of SSSGs having the maximum number of SSSGs among all lists in the at least one list of SSSGs;

a high layer signaling;

a number of SSSGs in the BWP, the BWP group, or the serving cell group;

a maximum SSSG ID number among the SSSGs in the BWP, the BWP group, or the serving cell group;

a number of SSSGs in a predefined BWP; or a maximum SSSG ID number among the SSSGs in a predefined BWP; or wherein the PDCCH monitoring behavior set is configured in a BWP associated with the UE, a BWP group associated with the UE, or a serving cell group associated with the UE;

the PDCCH monitoring behavior set does not comprise the at least one list of SSSGs;

the at least one list of PDCCH monitoring skipping durations is associated with one of: a list of SSSGs, a BWP, a BWP group, or a serving cell group; and determining the bit width of the field comprises determining the bit width of the field based on one of:

a number of PDCCH monitoring skipping durations in a target list of PDCCH monitoring skipping durations from the at least one list of PDCCH monitoring skipping durations, the target list of PDCCH monitoring skipping durations having a maximum number of PDCCH monitoring skipping durations among all lists in the at least one list of PDCCH monitoring skipping durations;

a high layer signaling; or a number of PDCCH monitoring skipping durations configured in a predefined BWP;

wherein the predefined BWP is determined by:

an RRC signaling;

a default BWP; or a BWP with a lowest index in a BWP group.

19. The method of claim 14, wherein the field indicates one of following PDCCH monitoring behaviors:

switching to a target SSSG indicated by the field;

skipping PDCCH monitoring for a PDCCH monitoring skipping duration indicated by the field, the PDCCH monitoring skipping duration being in a target list of PDCCH monitoring skipping durations from at least one list of PDCCH monitoring skipping durations, and the target list of PDCCH monitoring skipping durations being associated with an active SSSG; or determining that a value of the field is reserved.

20. A device for wireless communication comprising a memory for storing computer instructions and a processor in communication with the memory, wherein, when the processor executes the computer instructions, the processor is configured to implement the following:

receiving, from a wireless communication node in a wireless network, a configuration message comprising configuration information associated with a Physical Downlink Control Channel (PDCCH) monitoring behavior set;

receiving, from the wireless communication node, a control message indicating a PDCCH monitoring behavior in the PDCCH monitoring behavior set; and determining a PDCCH monitoring behavior based on the control message, wherein the control message indicates the PDCCH monitoring behavior in the PDCCH monitoring behavior set via a field in the control message;

wherein the processor is configured to further implement determining a bit width of the field;

wherein the control message is received from a first serving cell in a serving cell group, and the processor is configured to further implement;

applying a first PDCCH monitoring behavior in the first serving cell according to the field; and applying a second PDCCH monitoring behavior in a second serving cell in the serving cell group according to the field;

wherein the processor is configured to implement applying the second PDCCH monitoring behavior in the second serving cell in the serving cell group according to the field by one of the following:

in response to a bit-width of the field being larger than a target bit-width required for indicating a PDCCH monitoring behavior for the second serving cell: obtaining a target field by truncating the field to the target bit-width; and applying the second PDCCH monitoring behavior in the second serving cell according to the target field;

or in response to a bit-width of the field being less than a target bit-width required for indicating a PDCCH monitoring behavior for the second serving cell: prepending or appending 0 to the field to obtain a target field with the target bit-width; and applying the second PDCCH monitoring behavior in the second serving cell according to the target field.

* * * * *